United States Patent
Erbacher et al.

(10) Patent No.: US 10,940,773 B2
(45) Date of Patent: Mar. 9, 2021

(54) VEHICLE SEAT

(71) Applicant: BROSE FAHRZEUGTEILE GMBH & CO. KOMMANDITGESELLSCHAFT, COBURG, Coburg (DE)

(72) Inventors: Bastian Erbacher, Kulmbach (DE);
Jochen Hofmann, Marktgraitz (DE);
Christian Schnapp, Altenkunstadt (DE); Marcel Amstein, Marisfeld (DE);
Stefan Henning, Alheim (DE); Enno Meyer, Untersiemau (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 412 days.

(21) Appl. No.: 15/542,054

(22) PCT Filed: Jan. 21, 2016

(86) PCT No.: PCT/EP2016/051183
§ 371 (c)(1),
(2) Date: Aug. 4, 2017

(87) PCT Pub. No.: WO2016/120143
PCT Pub. Date: Aug. 4, 2016

(65) Prior Publication Data
US 2018/0001790 A1    Jan. 4, 2018

(30) Foreign Application Priority Data

Jan. 26, 2015    (DE) .................... 10 2015 201 232.8

(51) Int. Cl.
*B60N 2/02* (2006.01)
*B60N 2/812* (2018.01)
(Continued)

(52) U.S. Cl.
CPC ............. *B60N 2/0284* (2013.01); *B60N 2/02* (2013.01); *B60N 2/08* (2013.01); *B60N 2/085* (2013.01);
(Continued)

(58) Field of Classification Search
CPC combination set(s) only.
See application file for complete search history.

(56) References Cited

U.S. PATENT DOCUMENTS 7,938,488 B2 *    5/2011    Thiel .................... B60N 2/0284
                                                297/284.11
8,141,951 B2 *    3/2012    Chen .................... B60N 2/2821
                                                297/256.11
(Continued)

FOREIGN PATENT DOCUMENTS

CN        103209859 A      7/2013
CN        203472581 U      3/2014
(Continued)

OTHER PUBLICATIONS

Chinese First Office action dated Dec. 10, 2018 cited in corresponding CN Application No. 2016800073175, 8 pages, with English Translation, 3 pages.
(Continued)

*Primary Examiner* — Anthony D Barfield
(74) *Attorney, Agent, or Firm* — Lewis Roca Rothgerber Christie LLP

(57) ABSTRACT

A vehicle seat is provided. The vehicle seat comprises construction elements that are movable relative to one another and at least one force transmission element which transmits activation forces and/or stress forces that result from the use of the vehicle seat from one construction element to the other. The force transmission element by way of at least one joint is connected to both construction (Continued)

elements, and conjointly with the at least one joint is an integral component part of at least one of the two construction elements.

20 Claims, 20 Drawing Sheets

(51) Int. Cl.
    *B60N 2/90* (2018.01)
    *B60N 2/08* (2006.01)
    *B60N 2/16* (2006.01)
    *B60N 2/18* (2006.01)
    *B60N 2/28* (2006.01)

(52) U.S. Cl.
    CPC ......... *B60N 2/1685* (2013.01); *B60N 2/1892* (2013.01); *B60N 2/2851* (2013.01); *B60N 2/812* (2018.02); *B60N 2/914* (2018.02); *B60N 2/986* (2018.02); *B60N 2/995* (2018.02); *B60N 2002/0288* (2013.01)

(56) References Cited

U.S. PATENT DOCUMENTS

| | | |
|---|---|---|
| 9,511,688 B2 | 12/2016 | Linnenbrink et al. |
| 2007/0001498 A1 | 1/2007 | Bauersachs et al. |
| 2009/0033134 A1 | 2/2009 | Hofmann et al. |
| 2009/0085387 A1 | 4/2009 | Thiel et al. |
| 2010/0109401 A1 | 5/2010 | Booth et al. |
| 2012/0019037 A1 | 1/2012 | Röhnert et al. |
| 2013/0257126 A1 | 10/2013 | Freisleben et al. |
| 2014/0062158 A1 | 3/2014 | Line et al. |
| 2015/0306942 A1 | 10/2015 | Heidan et al. |
| 2016/0088946 A1 | 3/2016 | Bock |

FOREIGN PATENT DOCUMENTS

| | | |
|---|---|---|
| DE | 29596998 U1 | 7/1995 |
| DE | 19961070 C1 | 4/2001 |
| DE | 10135122 C1 | 12/2002 |
| DE | 202004011387 U1 | 11/2005 |
| DE | 102005029665 A1 | 12/2006 |
| DE | 202007002803 U1 | 7/2007 |
| DE | 102008004124 A1 | 7/2009 |
| DE | 202009002580 U1 | 8/2010 |
| DE | 202011108008 U1 | 3/2012 |
| DE | 102010042879 A1 | 4/2012 |
| DE | 102010044057 A1 | 5/2012 |
| DE | 102012013208 A1 | 11/2013 |
| DE | 102013104809 A1 | 11/2014 |
| EP | 1663700 B1 | 6/2008 |
| KR | 1998-021337 | 6/1998 |
| WO | WO2007/090642 A1 | 8/2007 |

OTHER PUBLICATIONS

Korean Office action dated Jan. 29, 2020 issued in corresponding Korean Application No. 10-2017-7022717, 10 pages, with English translation, 5 pages.

\* cited by examiner

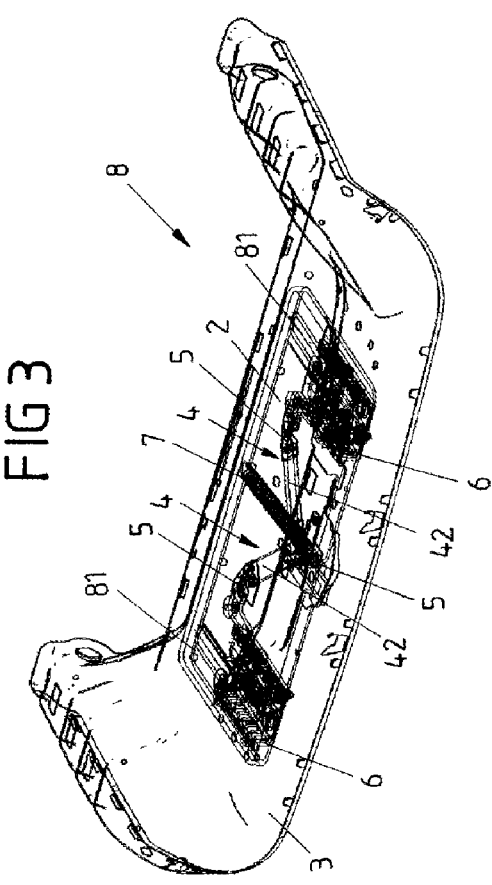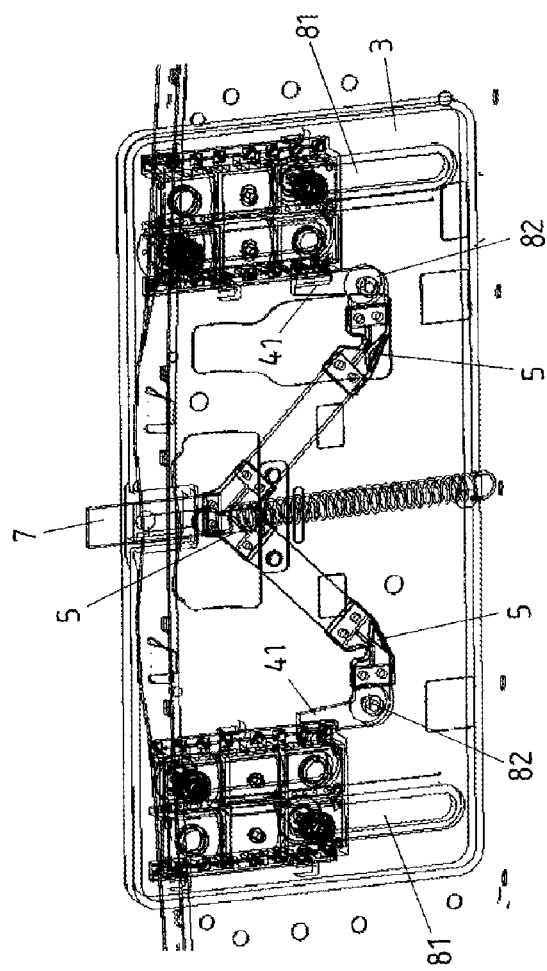

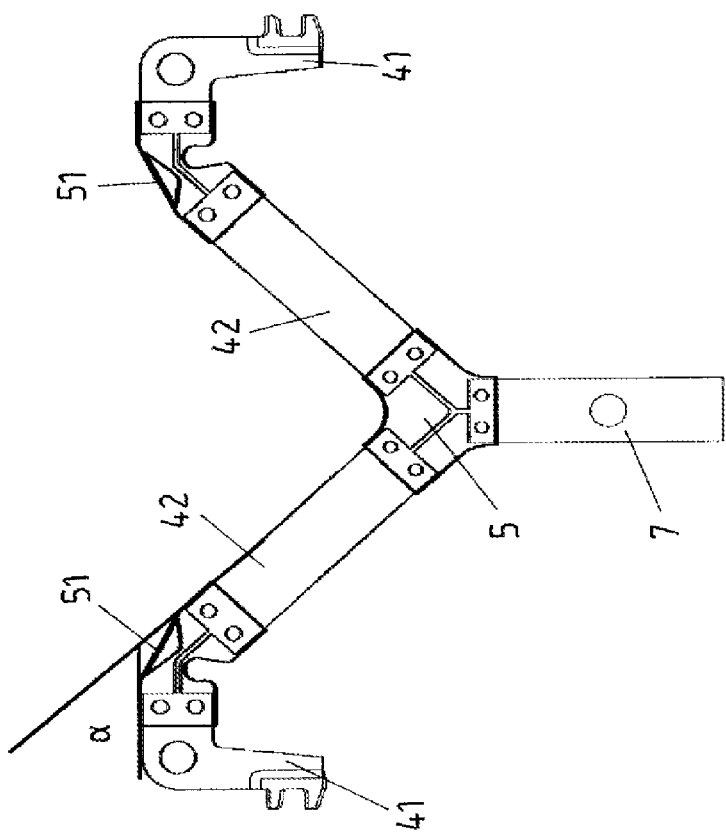
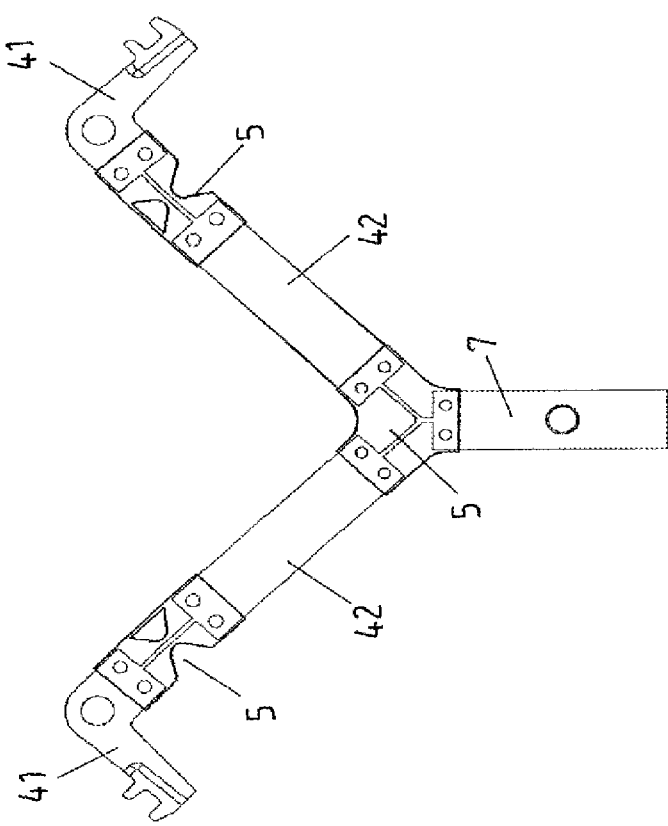

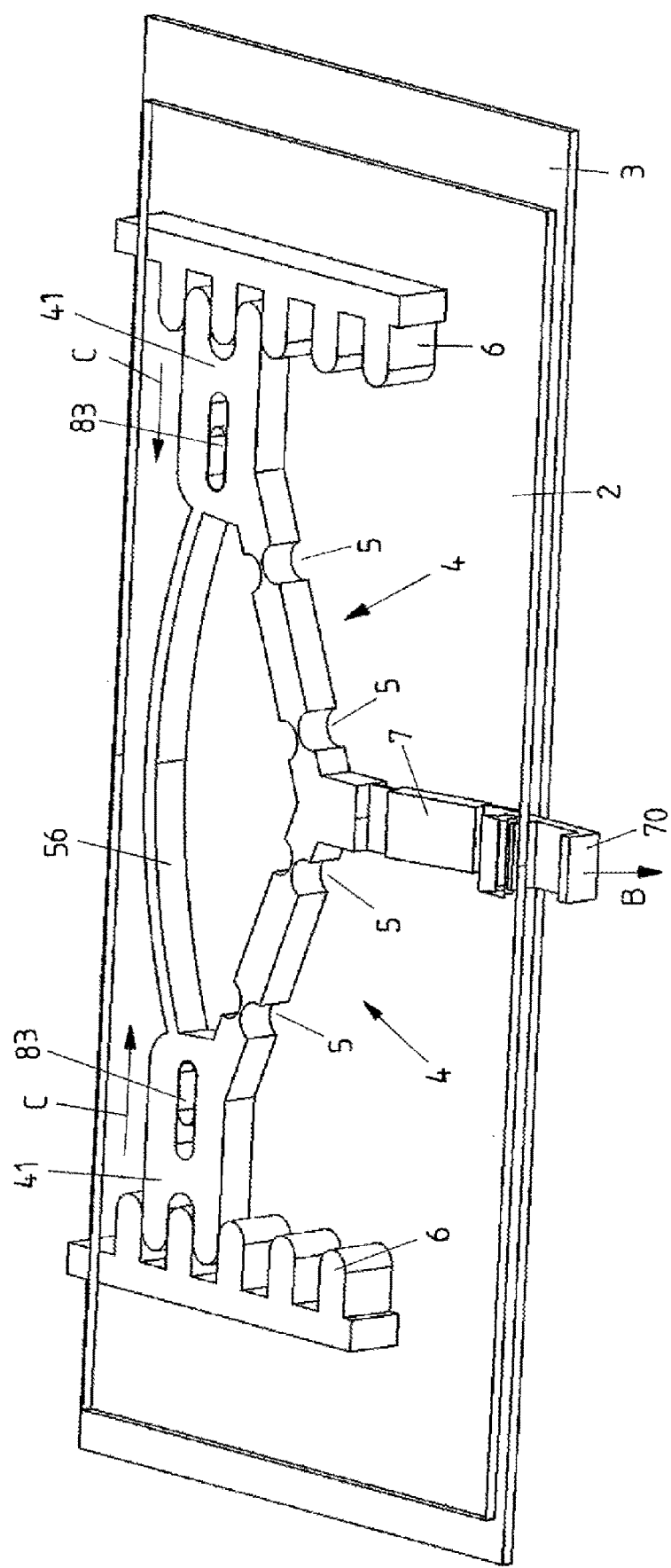

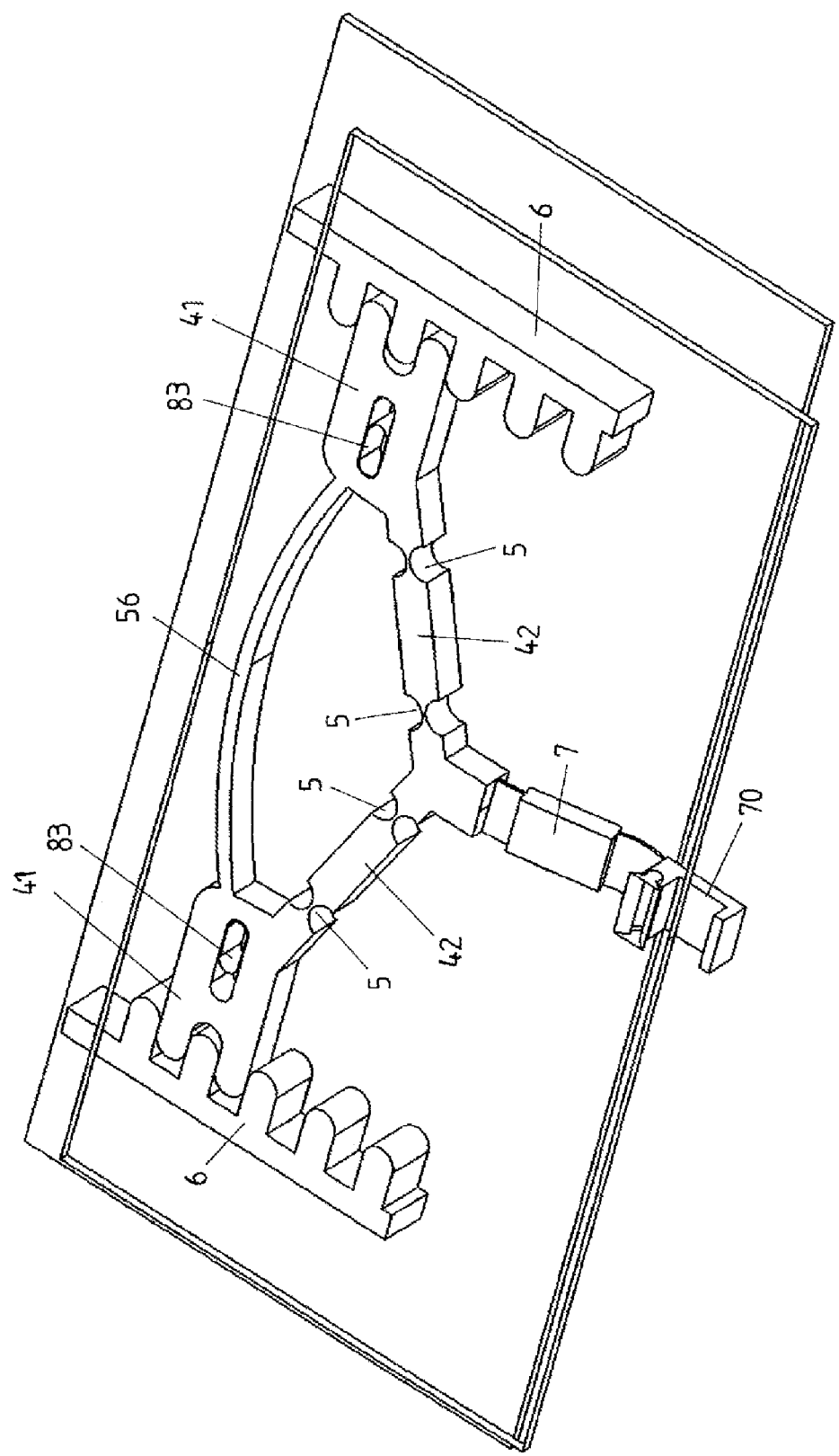

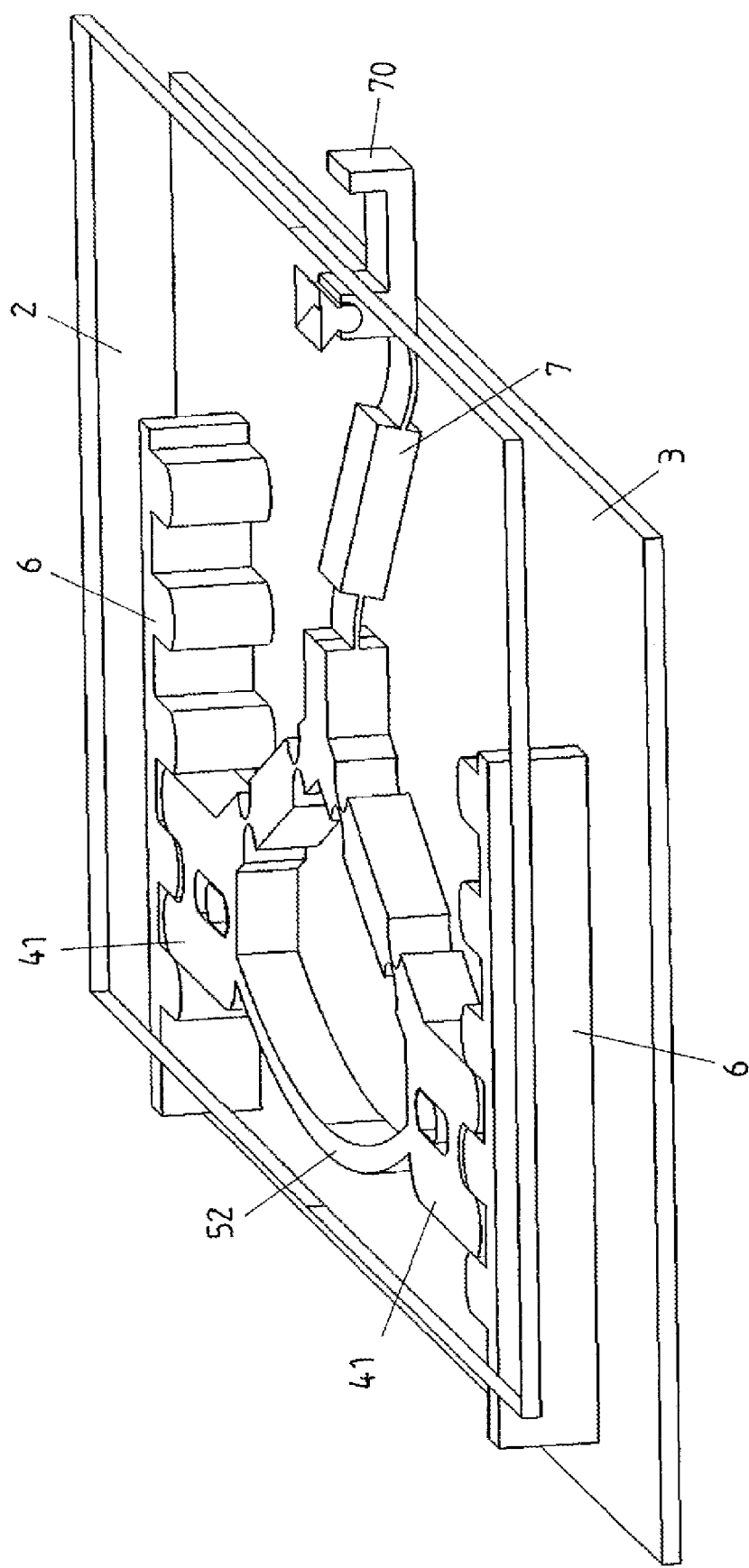

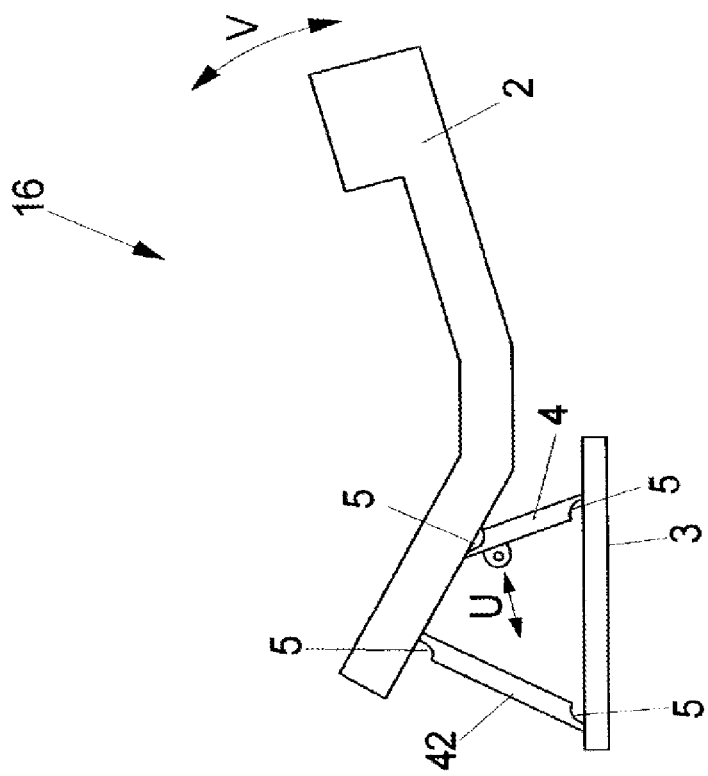
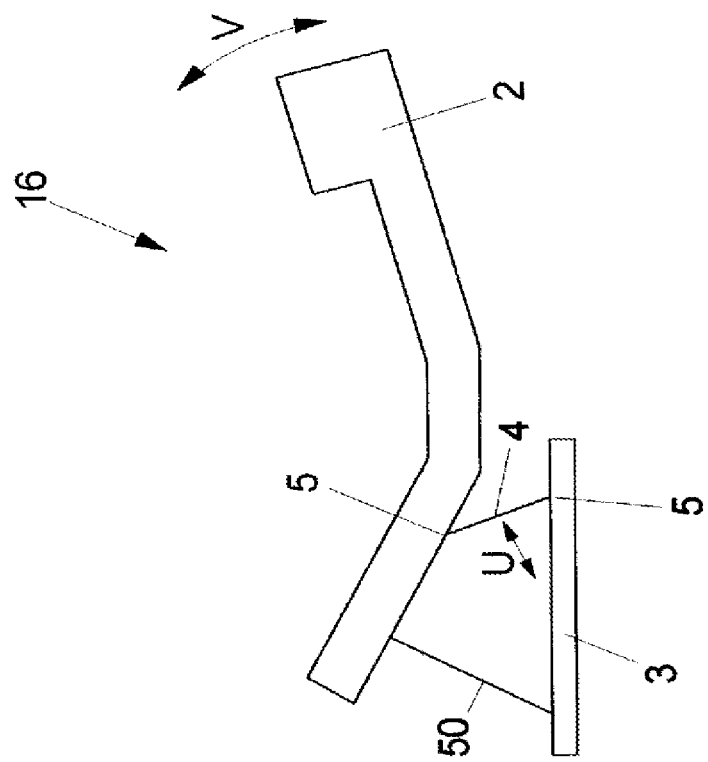

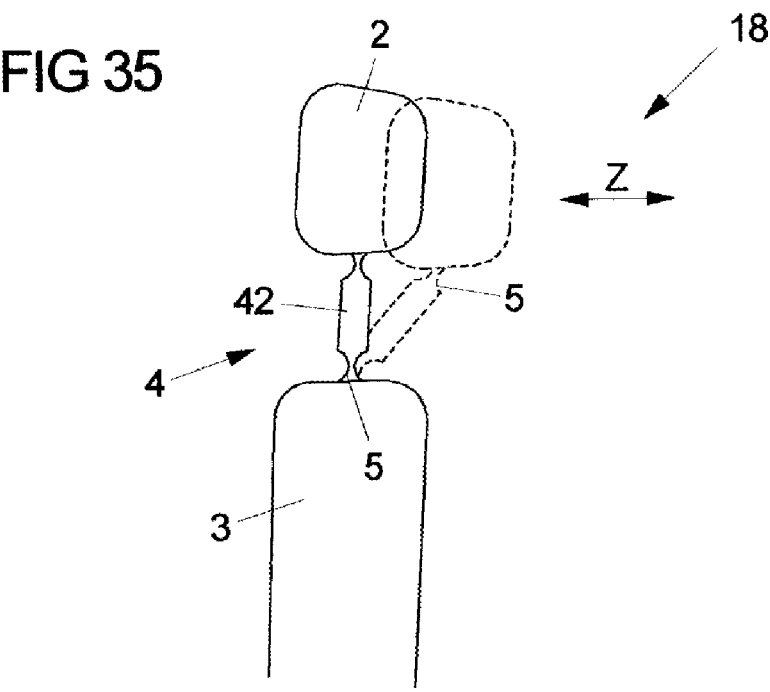
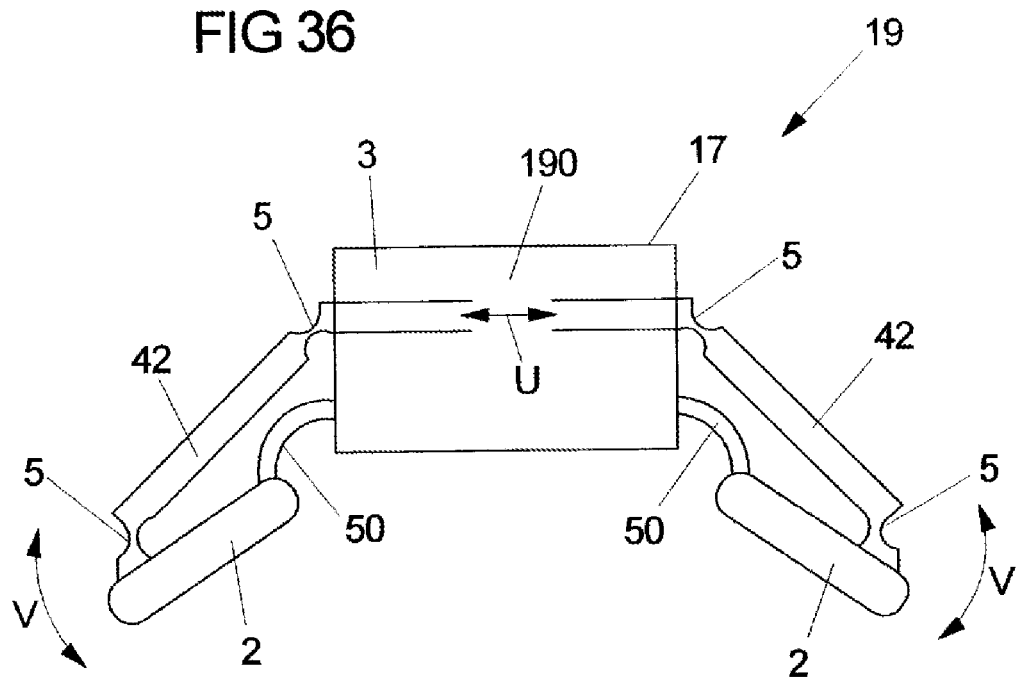

VEHICLE SEAT

CROSS-REFERENCE TO A RELATED APPLICATION

This application is a National Phase Patent Application of International Patent Application Number PCT/EP2016/051183, filed on Jan. 21, 2016, which claims priority of German Patent Application Number 10 2015 201 232.8, filed on Jan. 26, 2015, the contents of which are hereby incorporated by reference.

BACKGROUND

The invention relates to a vehicle seat having construction elements that are movable relative to one another and at least one force transmission element.

For the purpose of optimizing an ergonomic sitting position that offers protection in the event of a crash, vehicle seats have a multiplicity of adjustment possibilities such as a longitudinal and height adjustment of the vehicle seat, a depth and inclination adjustment of the seat lower part, an inclination and side bolster adjustment of the backrest, a height and inclination adjustment of a headrest, and the like. The kinematic assemblies of these seat adjustments require articulated connections which are made up from numerous components such as levers, axle pins, springs, etc. for the mutual adjustment of construction elements of the vehicle seat to the desired adjusted position, or for the connection of activation elements to the adjustment mechanisms and the rebound of said activation elements to an initial or neutral position. The large number of components for the adjustment mechanisms requires an accordingly high investment in the procurement of the components, the logistics, maintenance, assembly, and repair of the articulated connections, and said large number of components is accordingly associated with significant costs.

SUMMARY

It is an object of the present invention to provide a vehicle seat of the type mentioned at the outset, the mechanisms of said vehicle seat for the adjustment of construction elements that are movable relative to one another requiring a minimum number of components and thus a minimal investment in the procurement of the components, the logistics, assembly, maintenance, and repair of the articulated connections.

This object is achieved according to the invention by features as described herein.

The achievement according to the invention provides a vehicle seat of which the mechanisms for the adjustment of construction elements that are movable relative to one another require few components and accordingly thus guarantee a minimal investment in the procurement of the components, the logistics, assembly of the components, maintenance and repair of the articulated connections.

The force transmission element is preferably disposed so as to be integral to the installation part and so as to be movable in a material-inherently elastic manner.

The force transmission element in a preferred embodiment is configured either as a single-component part having at least one tapered region so as to be an all-solid joint, or as a bi-component or multiple-component part in which a fixed component is configured from rigid levers and at least one component that is disposed so as to be elastic between the two levers is configured as an all-solid joint.

The advantage of all-solid joints as compared to conventional joints that are made up from springs, bolts, and levers lies in particular in that all-solid joints, with the exception of minor friction on the material, are friction free, maintenance free, clearance free, and scalable in an arbitrary manner, and do not require any assembly, lubricants, and restoring springs, since springs can be dispensed with by utilizing the rebound effect of all-solid joints. Overall, a significant cost advantage thus results in the application of all-solid joints instead of conventional joints.

In the application of all-solid joints that are configured as bi-component or multiple-component parts, an elastic element which by means of a tensile, compressive, torsional, or flexural load reinforces the rebound of the all-solid joint can be additionally provided.

One alternative design embodiment of the force transmission element is that the force transmission element is configured as a rigid-in-compression monolithic knuckle joint which has a partially cylindrical external fork, or a partially spherical socket, and a partially cylindrical internal fork, or a partially spherical core, the external diameter of the latter fork or core bearing in a sliding manner on the internal diameter of the partially cylindrical external fork or partially spherical socket, and in that an all-solid joint is disposed between the partially cylindrical external fork, or the partially spherical socket, and the partially cylindrical internal fork, or the partially spherical core.

The design embodiment of the force transmission element as a rigid-in-compression monolithic knuckle joint guarantees that abusive and compression forces are absorbed by the partially cylindrical external fork, or the partially spherical socket, and by the partially cylindrical internal fork, or the partially spherical core, wherein the knuckle joint is producible from one part and can be interdisposed directly into the force flux between the construction elements that are adjustable relative to one another.

The force transmission element as a bionic joint can furthermore be composed having a joint socket that is disposed on a joint socket lever, and a spherical or cylindrical ball head that is disposed on the end of a ball head lever and mounted in the joint socket, and a flexible strap that connects the ball head lever to the joint socket lever.

The bionic joint is particularly suitable for absorbing high compression forces, while the flexible strap from an elastic material holds the joint together and herein can absorb high traction forces and deformations.

The all-solid joint can be configured differently so as to depend on the requirements and the field of application. The all-solid joint in a first embodiment is configured as a leaf spring and is distinguished by an automatic restoration, a simple functional principle, a cost-effective production, and a minimum number of parts. In terms of a vehicle seat, a leaf spring joint is particularly suitable for unlocking a seat depth adjustment, for linking a seat shell of a vehicle seat, for adjusting the inclination of the backrest, or for folding down the backrest, respectively, and for adjusting the backrest width of a vehicle seat.

In conjunction with a compression-force absorbing support element which is connected in a rotatable manner to at least one of the construction elements that are movable relative to one another and is disposed so as to be parallel with the leaf spring joint, the application of leaf spring joints can be expanded to include the headrest inclination adjustment and the seat height adjustment.

In a further design embodiment, the force transmission element can be made up from a plurality of levers and all-solid joints that are disposed between the levers, in order for a monolithic multiple joint kinematic assembly to be formed between the construction elements that are movable relative to one another, wherein preferably one activation element is connected so as to be integral to the force transmission element.

A monolithic multiple joint kinematic assembly of this type, in a first design embodiment, can be configured as a monolithic quadruple joint kinematic assembly which includes the functions of a plurality of connection levers and of all-solid joints that are disposed between the connection levers, said monolithic quadruple joint kinematic assembly being connected to an engagement lever that locks an adjusted position of the vehicle seat. A monolithic quadruple joint kinematic assembly can inter alia convert a traction force that is exerted on the activation element to a compression force that is exerted on the engagement lever, an engagement lever being released by said compression force from a locking mechanism with the other construction element. This conversion of a traction force to a compression force can inter alia be employed in the case of a device for the longitudinal adjustment of a vehicle seat, in which device an engagement lever having locking pins that is operatively connected to the seat shell of the vehicle seat engages in a perforated toothing of a guide rail that is connected to the vehicle floor pan, wherein, when a traction force is exerted on the activation element, the quadruple joint kinematic assembly that is connected so as to be integral to the activation element acts on the locking lever with a compression force in order to lift the locking pins out of the perforated toothing.

In the application of a monolithic quadruple joint kinematic assembly for converting a traction force to a compression force in order to longitudinally adjust a vehicle seat, the reduction of the number of parts and thus of the assembly steps required for completing the longitudinal seat adjustment, costs are lowered, an automatic restoration is caused, separate assembling of an activation lever is avoided, and the reliability of the meshing engagement of the locking lever in the perforated toothing of the guide rail is enhanced, since the locking element is moved at an angle favorable to the effective direction of the contact faces of the locking pins and of the perforated toothing.

A further advantage in the use of a monolithic quadruple joint kinematic assembly lies in that the quadruple joint kinematic assembly can be varied depending on the application case, wherein the basic layout of the quadruple joint kinematic assembly can be specified in a manner analogous to that of conventional quadruple joint kinematic assemblies.

One variant of the quadruple joint kinematic assembly lies in interconnecting the construction elements that are movable relative to one another by way of elastically deformable all-solid joints, and by way of a force transmission element that is disposed so as to be parallel with said elastically deformable all-solid joints and by way of all-solid joints is connected to the construction elements that are movable relative to one another.

In the case of this quadruple joint kinematic assembly which can be employed in particular for a height adjustment of a vehicle seat, the connection of the gear members is performed by means of elastic deformable all-solid joints, while the adjustment force is generated by means of a spindle or pinion drive, and the compressive stability of the quadruple joint kinematic assembly is enhanced by the integration of the support geometries, wherein a movable mounting for rotation and a materially integral connection between the all-solid joint and the support geometry are guaranteed. This enables functional integration of the force transmission mechanism at a simultaneous reduction in components, reduction in production and assembly steps, and reduction in clearances in the mountings, and the compensation of additional adjustment movements that are required on account of the kinematic assemblies.

A further field of application of a monolithic multiple joint kinematic assembly is remote unlocking in which case an activation element that is connected to the one construction element by way of the multiple joint kinematic assembly is connected to a locking and/or adjusting element that is connected to the other construction element.

Remote unlocking of this type can be employed for example for activating a latching fitting by way of a dual joint kinematic assembly, and can be made from two parts as opposed to ten parts in the case of a conventional remote unlocking mechanism, wherein a restoring torsion spring such as is required in the case of a conventional mechanism can be dispensed with given a corresponding basic layout, since the restoration is performed by means of the all-solid joints such that a further cost saving can be achieved by fewer production and assembly steps and by molding an activation element directly onto the monolithic multiple joint kinematic assembly.

In a furthermore preferred embodiment, a conventional joint for receiving abusive forces is disposed in the force flux between the activation element that is connected to the one construction element, above the monolithic multiple joint kinematic assembly, and the other construction element.

In order to avoid any collision between the adjustment parts of an adjustment mechanism, the force transmission element connects an activation element that is disposed in a first plane to a construction element that is to be activated and is disposed in a second plane, wherein activation forces and/or stress forces that result from the utilization of the vehicle seat are intercepted by way of a conventional joint that is disposed on the effective line of the locking elements such that self-locking of a locking mechanism is guaranteed.

The configuration of an all-solid joint in the force flux between the activation element that is connected to the installation element and the locking mechanism receptacle that is connected to the other construction element guarantees an automatic restoration, the user-friendly configuration of the activation element as a pull lever and the adjustment mechanism that is producible from one piece. An arrangement of this type is particularly suitable for a mechanism for adjusting the seat depth of a vehicle seat in which an activation lever that is configured so as to have an integrated all-solid joint is disposed in a first plane, and the end of the activation lever is disposed in a second plane in which the locking mechanism receptacle that is connected to a seat shell of the vehicle seat is located, while the activation handle that is configured as a pull lever is connected to the seat depth adjustment plate by way of a conventional joint that is disposed on a seat depth adjustment plate.

A further variant of the solution according to the invention lies in that the force transmission element that is connected to one activation element in the manner of a monolithic gripper is linked to the connection between a first construction element that is connected to a locking element and a construction element to be activated.

A gripper mechanism of this type enables a compressive activation of the activation element in order for the locking mechanism to be unlocked, with an automatic restoration by virtue of the material-inherent elastic configuration of the force transmission element, and the integral production of the force transmission element. A preferred field of application of the monolithic gripper is a seat depth adjustment of a vehicle seat, in which the monolithic gripper is fastened to a seat depth adjustment plate, while a rack or perforated toothing that for locking interacts with the gripper is fastened to a seat shell of the vehicle seat.

The various variants of a force transmission element that have been set forth above individually or in combination enable the implementation of the most varied adjustment mechanisms on a vehicle seat.

For example, a seat depth adjustment of the vehicle seat having a seat depth adjustment part that is guided in a seat lower part of the vehicle seat and is movable in relation to the latter, having a locking installation for locking the seat depth adjustment part in an adjusted seat depth position of the seat depth adjustment part in relation to the seat substructure, can thus be implemented by way of a locking mechanism receptacle that is connected to the seat lower part, and by way of a force transmission element that is connected to an activation element and the seat depth adjustment part and is preferably configured as a leaf spring joint. The locking mechanism receptacle here is composed of a toothing, a toothed lever that is connected to the force transmission element engaging in the latter.

For load distribution, two seat depth adjustment parts that are guided so as to be mutually spaced apart in the seat lower part of the vehicle seat, and one locking installation having perforated toothings that are disposed on the sides of the seat depth adjustment parts, toothed levers pivoting into said perforated toothings and said toothed levers each being pivotable about axles that are connected to the seat lower part and by way of all-solid joints being connected so as to be integral to an activation element, while two connection levers that by way of a first all-solid joint are connected so as to be integral to an activation element that is guided in the seat lower part and that by way of a second or third, respectively, all-solid joint are connected so as to be integral to in each case one toothed lever.

BRIEF DESCRIPTION OF THE DRAWINGS

Further variants of the solution according to the invention will be described hereunder by means of the exemplary embodiments that are illustrated in the drawing.

FIGS. 3 to 6 show perspective illustrations and a plan view of a first variant of a seat depth adjustment installation of a vehicle seat, having all-solid joints.

FIG. 7 shows a schematic plan view of the force transmission element, provided with all-solid joints, of the seat depth adjustment according to FIGS. 3 to 6 in a delivered position.

FIG. 8 shows a schematic plan view of the force transmission element, provided with all-solid joints, of the seat depth adjustment according to FIGS. 3 to 6, in an installed situation.

FIGS. 9 to 11 show a plurality of perspective illustrations of a second variant of a seat depth adjustment installation for a vehicle seat.

FIGS. 31 and 32 show schematic illustrations of installations for adjusting the backrest width of a vehicle seat by means of a multiple element kinematic assembly.

FIG. 35 shows a schematic illustration of an installation for pivoting an upper backrest region of a vehicle seat by means of an all-solid joint and of an adjustment kinematic assembly.

FIG. 36 shows a schematic illustration of a headrest side bolster adjustment of a vehicle seat by means of elastically deformable all-solid joints.

DETAILED DESCRIPTION

Figure 1:
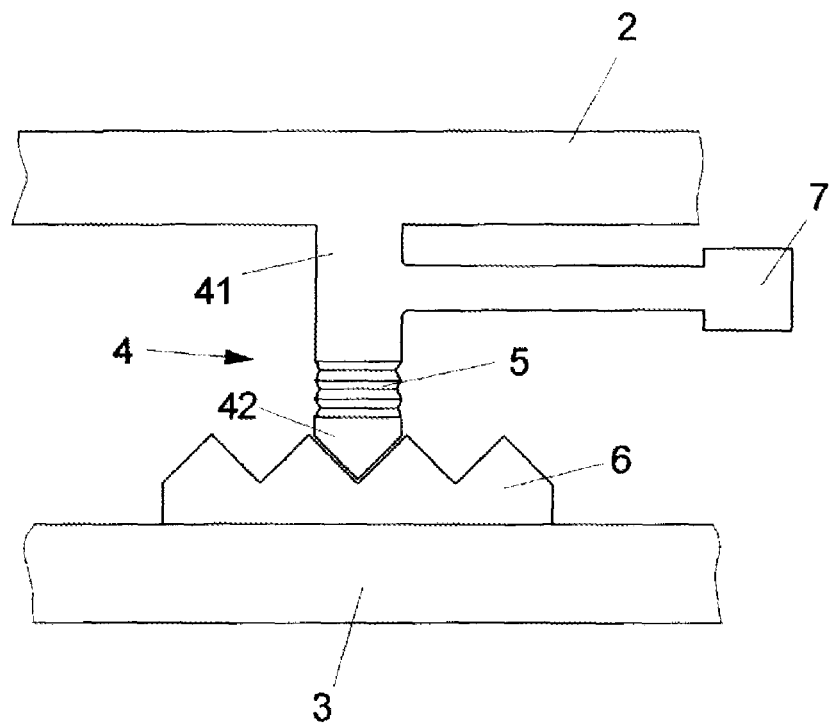
FIG. 1 shows a schematic illustration of a locking mechanism of two construction elements of a vehicle seat by means of an all-solid joint that is configured as a leaf spring joint and is connected to an activation lever.

The exemplary embodiments illustrated in the figures of the drawing elucidate the application of the solution according to the invention for transmitting activation forces and/or of stress forces that result from the utilization of a vehicle seat from a first construction element to a second construction element, movable relative to the first construction element, of a vehicle seat by means of a force transmission element for various adjustment devices of the vehicle seat, wherein force transmission elements, or combinations of force transmission elements, respectively, that are movable in a material-inherent elastic manner and in terms of the function and the construction thereof are adapted in an optimal manner to the respective adjustment device are employed for forming monolithic multiple joint or multiple element kinematic assemblies. The exemplary embodiments which are based on the functional principle schematically illustrated in FIG. 1 represent a selection of potential fields of application of the invention for the transmission of force between construction elements of a vehicle seat that are movable relative to one another in order for adjustment devices having a minimum of functional parts and an accordingly minimal investment in terms of assembly and costs to be implemented.

FIG. 1 in a schematic illustration shows two construction elements 2, 3 of a vehicle seat that are movable relative to one another and for the transmission of activation forces or of stress forces that result from the utilization of the vehicle seat, respectively, are connected to parts of a force transmission element 4. The force transmission element 4 is connected so as to be integral to the one construction element 2 and is movable in a material-inherently elastic manner. In order for an adjusted position of the construction elements 2, 3 that are movable relative to one another to be secured, the force transmission element 4 engages in a positively-locking manner in a form-fitting receptacle 6, for example a toothing or a latch, that is connected to the other construction element 3. In order for the positively-locking connection of the construction elements 2, 3 to be unlocked by way of the force transmission element 4, an activation element 7 which is preferably connected so as to be integral to the force transmission element 4 is provided such that, as a consequence of the material-inherently elastic configuration of the force transmission element 4, the latter is lifted out of the form-fit with the form-fitting receptacle 6 and following a mutual adjustment of the construction elements 2, 3 elastically latches into the form-fitting receptacle 6 again.

As will be explained in more detail hereunder, the material-inherently elastic configuration of the force transmission element 4 is caused by an all-solid joint 5 or a leaf spring joint 50, respectively. Herein, the region of the force transmission element 4 which is connected so as to be integral to the one construction element 2 or which is configured on the construction element 2, respectively, that allows a relative movement, in particular a rotation, by flexing between two rigid solid regions 41, 42 is referred to as the all-solid joint 5. Accordingly, the all-solid joint 5 is not a conventional joint in the sense of a kinematic pairing but is based on the principle of elastostatics, wherein the function of a joint is achieved by way of a region of reduced flexural rigidity relative to two adjacent regions of higher flexural rigidity. As will be explained in more detail hereunder, the reduced rigidity is preferably generated by way of a local reduction in the cross section.

Figure 2:
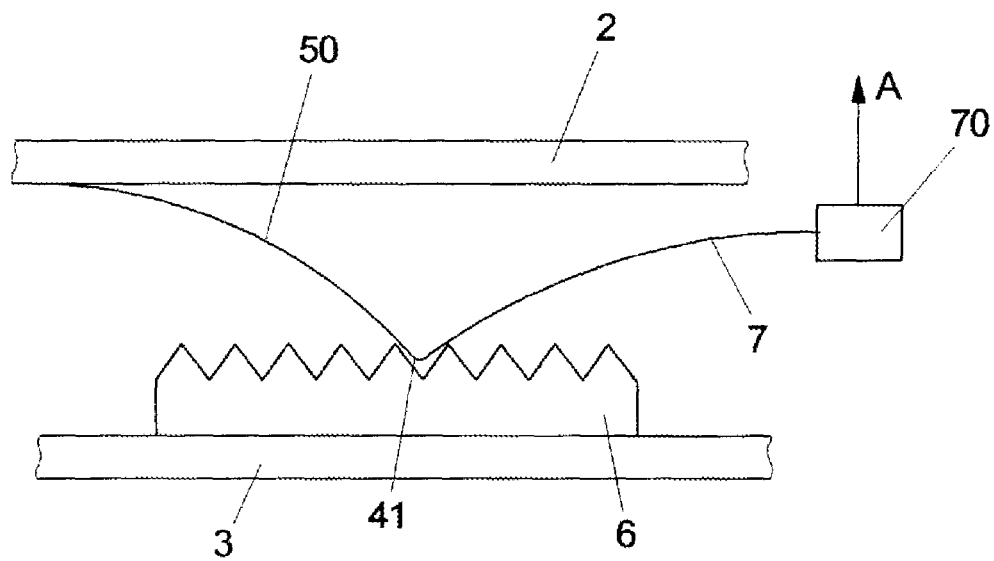
FIG. 2 shows a schematic illustration of a locking element, configured as a leaf spring joint, between two construction elements of a seat depth adjustment of a vehicle seat that are movable relative to one another.
Figure 5:
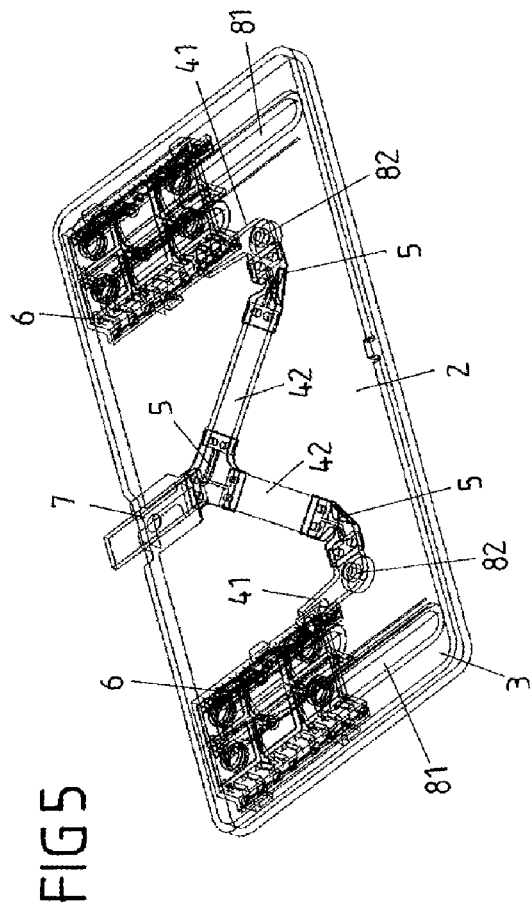
Figure 6:
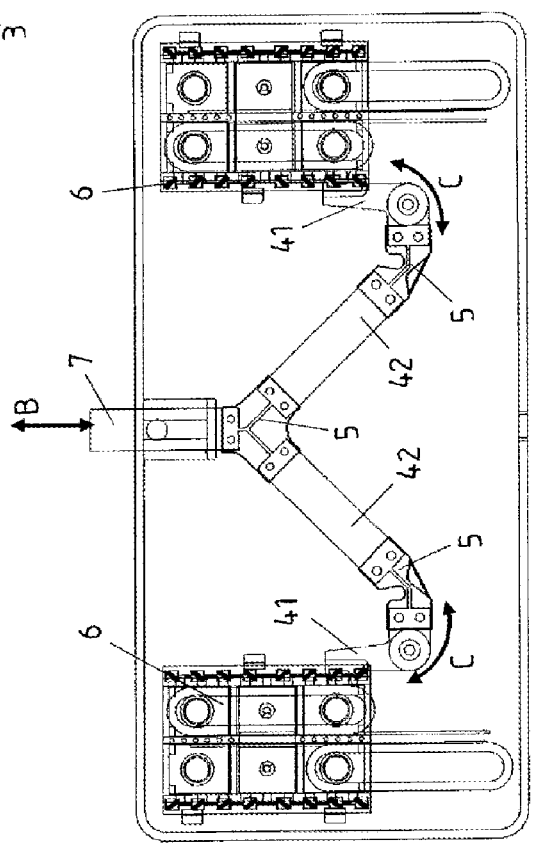

FIG. 2 in a schematic illustration shows a force transmission element, configured as a leaf spring joint 50, between two construction elements 2, 3 that are movable relative to one another, in a first variant, for example of a seat depth adjustment 8 of a vehicle seat, wherein the leaf spring joint 50 is connected to a seat depth adjustment plate 2 of the seat depth adjustment 8, and the form-fitting receptacle 6 is connected to a seat shell 3 of the vehicle seat. In order for a seat depth adjustment to be locked in a positively-locking manner, the end of the leaf spring joint 50 that faces away from the seat depth adjustment plate 2 engages in the toothing or the latch, respectively, of the form-fitting receptacle 6. In order for the seat depth adjustment plate 2 to be adjusted in relation to the seat shell 3, an activation lever 7 is provided which is fixedly connected to the leaf spring joint 50, on the one hand, and has an activation handle 70, on the other hand, such that the positive-locking engagement of the leaf spring joint 50 in the toothing or latch, respectively, of the form-fitting receptacle 6 is unlocked and the seat depth adjustment plate 2 in relation to the seat shell 3 can be displaced to a desired position by lifting the activation handle 70 in the direction of the arrow A. As a consequence of the resilient-elastic restoring effect thereof, the leaf spring joint 50 following the release of the activation handle 70 latches into the toothing or latch, respectively, of the form-fitting receptacle 6 again, and thus blocks the seat depth adjustment plate 2 in the desired adjusted position in relation to the seat shell 3.

A second exemplary embodiment of a seat depth adjustment of a vehicle seat by means of force transmission elements having all-solid joints is illustrated in FIGS. 3 to 8. In the case of this first variant of a seat depth adjustment according to FIGS. 3 to 6, the seat depth adjustment plate 2 is guided on both sides of a central longitudinal axis in longitudinal guides 81 that are disposed in a seat shell 3. Engagement levers 41 of the force transmission elements 4, by way of form-fitting elements engage in the form-fitting receptacles 6 that along the longitudinal guides 81 are connected to the seat shell 31, said engagement levers 41 by way of all-solid joints 5 being connected to the one ends of connection levers 42 of the force transmission elements 4, the other ends thereof being connected to an activation lever 71 by way of all-solid joints 5. Pivot axles 82 which are set back in the seat depth adjustment plate 2 are provided for the pivotable mounting of the engagement levers 41 of the force transmission elements 4.

As can be derived in particular from FIGS. 4 to 8, the all-solid joints 5 have regions of reduced flexural rigidity relative to the adjacent regions of high flexural rigidity of the engagement levers 41, of the connection levers 42, and of the activation lever 7. As can be derived from the plan view according to FIG. 6, an activation of the activation lever 7 in the direction of the arrow B leads to a pivoting movement of the engagement levers 41 about the pivoting axles 82 such that the engagement levers 41 either engage in the form-fitting receptacles 6 that are configured in particular as a perforated toothing, or are pivoted out of the perforated toothings, respectively, in order for the seat depth adjustment plate 2 to be able to be adjusted along the longitudinal guides 81 in relation to the seat shell 3.

In order for the elastic rebound of the all-solid joints 5 that are disposed between the engagement levers 41 and the connection levers 42 to be increased without additional spring elements, the all-solid joints 5 in the installed situation illustrated in FIG. 8 are biased by a bias angle α in relation to the delivered position illustrated in FIG. 7. An additional rebound effect is achieved by spring elements 51 that are disposed on the all-solid joints 5 and according to FIGS. 5 to 8 are configured as traction elements. Alternatively however, spring elements that are configured as compression, flexural, or torsion springs can also be provided, which for reinforcing the rebound effect are connected to the all-solid joints 5 in a corresponding manner.

A third variant of a seat depth adjustment 8 is illustrated in a schematic perspective manner in FIGS. 9 to 11. This variant differs from the first variant of a seat depth adjustment as described above by means of FIGS. 3 to 8 by the arrangement of two gate-type guides 83 for mounting the engagement levers 41 of the force transmission elements 4 that are connected to the seat depth adjustment plate 21, the form-fitting elements of said force transmission elements 4 engaging in the mating form-fitting elements of the form-fitting receptacle 6 that is connected to the seat shell 3.

In order to restore automatically to the locking position, the engagement levers 41 are interconnected by way of a spring bracket 56 that is configured as a leaf spring joint and causes self-blocking when the activation lever 7 following a seat depth adjustment is automatically reset once the activation handle 70 has been released.

Figure 12:
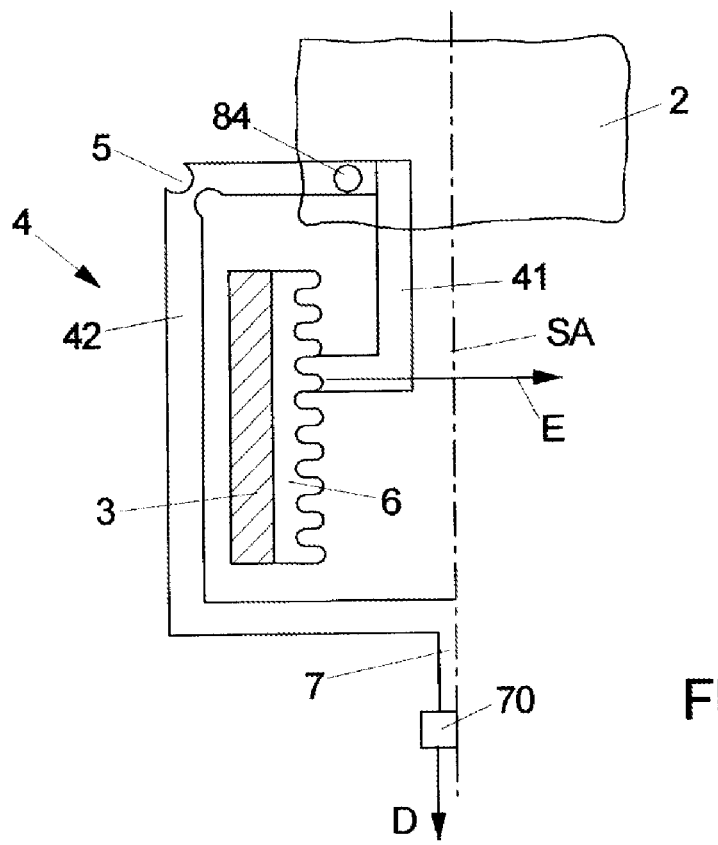
FIG. 12 shows a schematic illustration of a third variant of a seat depth adjustment installation having a locking element and an all-solid joint, the two latter being disposed in different planes.

A fourth variant of a seat depth adjustment by means of a force transmission element having all-solid joints is schematically illustrated in FIG. 12 and is distinguished by a force transmission element 4 that for the avoidance of collisions is disposed in two planes.

The force transmission element 4 that is connected to a seat depth adjustment plate 2 and is disposed in a first plane has a connection lever 42 having an integrated all-solid joint 5, said connection lever 42 being connected to an activation lever 7 and for intercepting forces being mounted in a conventional joint 84 of the seat depth adjustment. In a second plane, the connection lever 42 at the end side is connected to an engagement lever 41 of the force transmission element 4. As has been described above, the form-fitting elements of the engagement lever 41 engage in the mating form-fitting elements, for example in the form of a toothing or latch, of the form-fitting receptacle 6 that is connected to the seat shell 3, in order for an adjusted seat depth position to be blocked, said form-fitting elements by exerting a traction force on the activation handle 70 of the activation lever 7 and thus on the connection lever 42 being capable of being lifted out of the latching mechanism with the mating form-fitting elements of the form-fitting receptacle 6, such that the seat depth adjustment plate 2 which is guided for example in a manner analogous to that of FIGS. 3 to 6 in longitudinal guides of the seat shell 3 can be adjusted to a desired seat depth position.

As a consequence of the arrangement of an all-solid joint 5 in the connection lever 42, an automatic restoration of the force transmission element 4 and thus a fresh engagement of the form-fitting elements of the engagement lever 41 in the mating form-fitting elements of the form-fitting receptacle 6 is performed in order for the desired adjusted position to be blocked.

In the case of this fourth variant of a seat depth adjustment by means of an all-solid joint 5, the activating and adjusting forces are intercepted by way of the conventional joint 84, the arrangement of the latter on the effective line of the locking forces of the form-fitting elements of the engagement lever 41 and of the mating form-fitting elements of the form-fitting receptacle 6 guaranteeing self-locking, while the all-solid joint 5 causes the automatic restoration. This fourth variant also enables a user-friendly activation of the activation lever 7 by traction, and guarantees the production of the articulated force transmission element 4 and the activation lever 7 from one piece.

Figure 13:
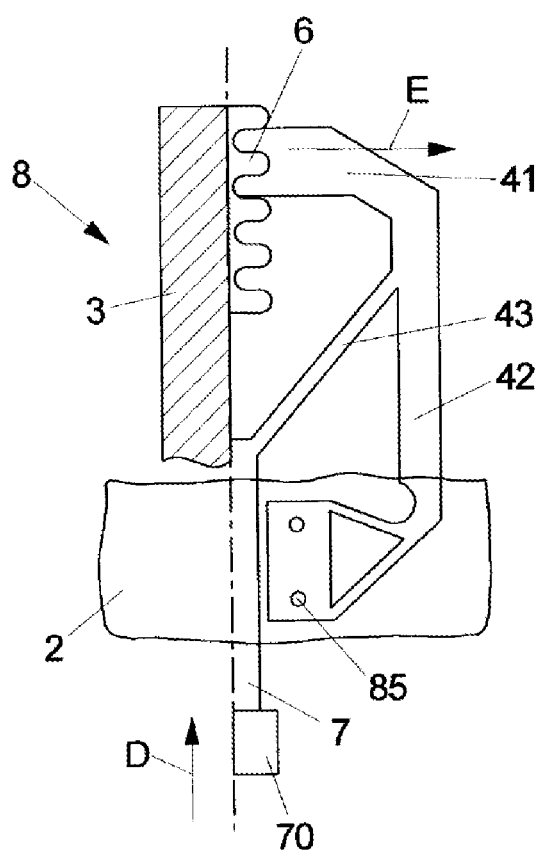
FIG. 13 shows a fourth variant of a seat depth adjustment installation having a monolithic gripper.

FIG. 13 in a schematic illustration shows a fifth exemplary embodiment of a seat depth adjustment 8 having a force transmission element 4 that is configured as a monolithic gripper. The resilient seat depth adjustment mechanism according to FIG. 13 that is based on a reversed gripper principle, in a manner analogous to that of the variants described above, has a form-fitting receptacle 6 that is connected to a seat shell 3, the form-fitting elements of an engagement lever 41 of the force transmission element 4 engaging in the mating form-fitting elements of said form-fitting receptacle 6. The force transmission element 4 that by way of articulations 85 is connected to a seat depth adjustment plate 22, apart from the engagement lever 41 and a connection lever 42, has a push bar 43 which is connected to an activation lever 7, the end of the latter having an activation handle 70. All-solid joints 5 are configured between the articulations 85 and the connection lever 42 of the force transmission element 4, between the activation lever 7 and the push bar 43, and between the push bar 43 and the connection lever 42.

On account of the activation of the activation handle 70 by way of pressure, the activation lever 7 is repositioned in the direction of the arrow D such that, as a consequence of connection lever 42 of the force transmission element 4 that by way of the articulations 85 is connected in an articulated manner to the seat depth adjustment plate 2 and connected in an articulated manner to the push bar 43, and as a consequence of the connection of said connection lever 42 to the engagement lever 41, the form-fitting elements of the engagement lever 41 are pivoted in the direction of the arrow E out of the locking mechanism of said form-fitting elements with the mating form-fitting elements of the form-fitting receptacle 6, in order for the seat depth adjustment plate 2 to be adjusted in relation to the seat shell 3. By virtue of the rebound effect of the all-solid joints 5, the engagement lever 41 of the force transmission element 4 is pivoted back once the activation of the activation lever 7 by way of pressure has terminated, such that the form-fitting elements of the engagement lever 41 latch in the mating form-fitting elements of the form-fitting receptacle 6 of the seat shell 3 again in order for the desired seat depth position to be secured.

Combinations of force transmission elements for forming monolithic multiple joint and multiple element kinematic assemblies 4' or 4", respectively, for various adjustment installations on vehicle seats will be explained by means of FIGS. 14 to 20 described hereunder.

Figure 14:
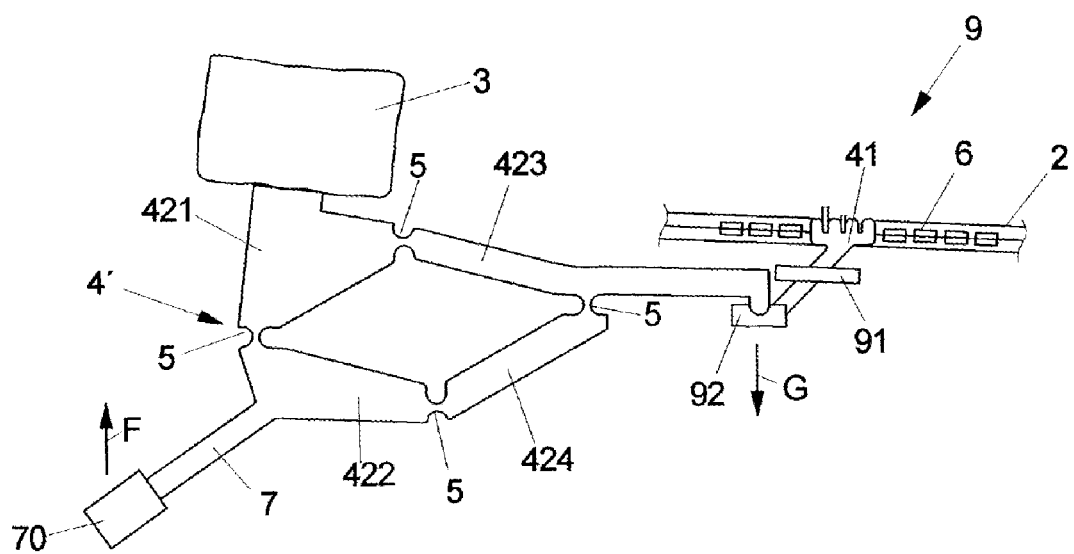
FIG. 14 shows a schematic illustration of a force transmission element having a monolithic quadruple joint kinematic assembly for converting a traction force to a compression force.

FIG. 14 in a schematic illustration shows a longitudinal adjustment installation 9 for a vehicle seat, for adjusting a seat substructure 3 of the vehicle seat in relation to the guide rails 2 that are connected to a vehicle floor pan, a toothing or perforated toothing, respectively, of a form-fitting receptacle 6 being disposed in said guide rails 2. The longitudinal adjustment installation 9 that is connected to the seat substructure 3 has a monolithic quadruple joint kinematic assembly 4' for converting a traction movement of an activation lever 7 to a compression movement for activating an engagement lever 41 that by way of form-fitting elements engages in the mating form-fitting elements of the form-fitting receptacle 6 of the guide rails 2 and that is mounted in a conventional lever mounting 91. The monolithic quadruple joint kinematic assembly 4' has four connection levers 42 which are mutually connected by means of four all-solid joints 5 in order for the monolithic quadruple joint kinematic assembly 4' to move in a material-elastic manner.

A first connection lever 421 is linked to the seat substructure 3 and by way of all-solid joints 5 connected to both a second connection lever 422 that is connected so as to be integral to the activation lever 7, as well as to a third connection lever 423 that interacts with the engagement lever 41 by way of an all-solid joint 5. A fourth connection lever 424 for forming the monolithic quadruple joint kinematic assembly 4' is disposed in each case by way of all-solid joints 5 between the second connection lever 422 and the third connection lever 423. In the activation of the activation lever 7 by way of a traction force in the direction of the arrow F, the third connection lever 423 by way of a compression force in the direction of the arrow G acts on a transmission part 92 that is connected to the engagement lever 41, such that the engagement lever 41 by way of the form-fitting elements thereof is lifted out of the mating form-fitting elements of the form-fitting receptacle 6 of the guide rails 2 in order for the vehicle seat to be longitudinally adjusted.

Upon termination of the traction force F, the engagement lever 41 that is mounted in the conventional lever mounting 91 is reset under the spring action of the all-solid joint 5, such that the form-fitting elements of the engagement lever 41 engage in the mating form-fitting elements of the form-fitting receptacle 6 of the guide rails 2 again, and thus block the adjusted longitudinal position of the seat.

The monolithic quadruple joint kinematic assembly 4', schematically illustrated in FIG. 14, for converting a traction force to a compression force can optionally also be employed as a headrest height adjustment installation or as a seat depth adjustment installation, and is distinguished by a reduction in costs by reducing the number of parts of the convertor installation 9 and thus of the steps required for the assembly, by an automatic restoration of the adjustment installation, by the possibility of molding the activation lever 7 directly onto the quadruple joint kinematic assembly 4', and by a movement of the engagement lever 41 at a favorable angle to the effective direction of the contact faces of the transmission part 92 that is disposed between the third connection lever 423 and the engagement lever 41. Moreover, the monolithic quadruple joint kinematic assembly 4' by dimensioning the connection levers 421 to 424, the activation lever 7, and the engagement lever 41 in a corresponding manner, can be adapted to any application cases.

In one alternative embodiment, for example, the first connection lever 421 entrains directly the engagement lever 41 without a transmission part 92 being disposed between the first connection lever 421 and the engagement lever 41.

Figure 16:
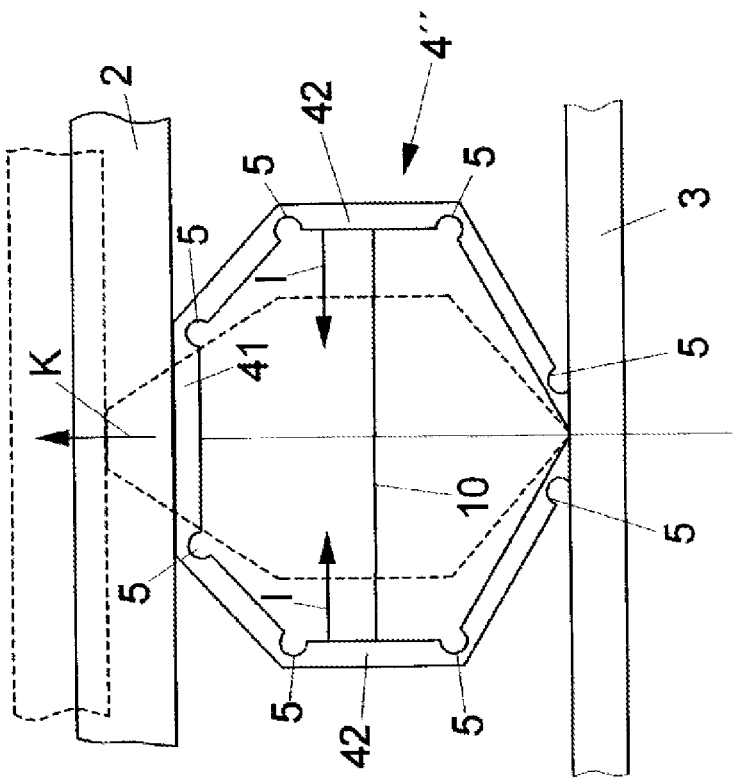
FIGS. 15 and 16 show schematic illustrations of the connection of a plurality of kinematic elements by means of elastically deformable all-solid joints.
Figure 15:
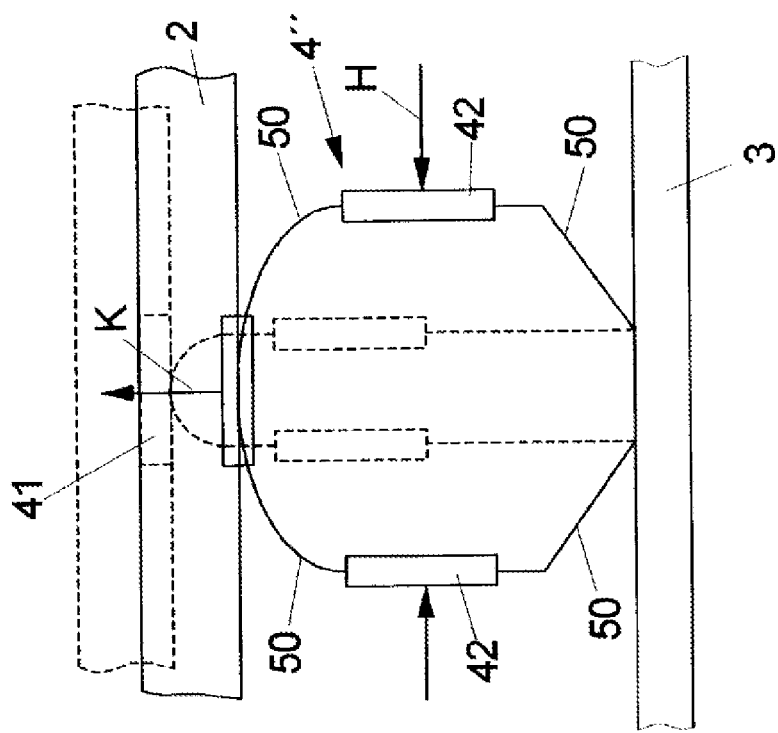

The force transmission element that is schematically illustrated in FIGS. 15 and 16 has a multiple element kinematic assembly 4" for converting adjustment forces in desired adjustment directions. According to FIG. 15, for this purpose, two mutually opposite connection levers 42 by way of leaf spring joints 50 are connected to an engagement lever 41, which is connected to a construction element 2 to be adjusted, and to a static construction element 3, so as to form a closed ring.

According to FIG. 16, a plurality of connection levers 42 by way of all-solid joints 5 are mutually connected, are connected to an engagement lever 41 that is connected to the construction element 2 to be adjusted, and connected to a static construction element 3, so as to form a closed ring.

A modification of the shape of the multiple element kinematic assembly 4" and thus an adjustment of the engagement lever 41 that is connected to the construction element 2 to be adjusted in the direction of the arrow K according to FIGS. 15 and 16 is performed by exerting a compression force, for example by means of a spindle, in the direction of the arrow H according to FIG. 15 on both mutually opposite connection levers 42, or a traction force in the direction of the arrow I according to FIG. 16, for example by way of a Bowden unit 10.

The monolithic multiple element kinematic assembly 4" illustrated in FIGS. 15 and 16 is distinguished by a functional integration and a reduction in components, a reduction in the production and assembly steps, and in a reduction in the clearances in mountings.

Figure 17:
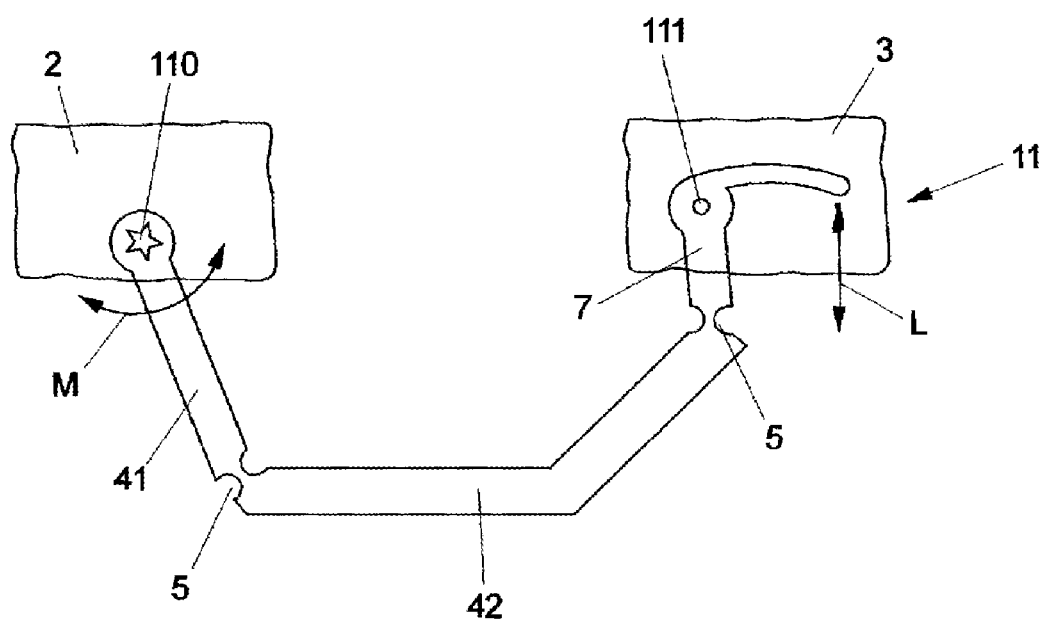
FIG. 17 shows a schematic illustration of a monolithic kinematic assembly for remotely unlocking a latching fitting for adjusting the seat height or the backrest inclination of a vehicle seat.

FIG. 17 in a schematic illustration shows a monolithic kinematic assembly for remotely unlocking a drive unit 110, for example a latching fitting, configured for seat height or backrest inclination adjustment 11 of a vehicle seat. In the case of this embodiment of the solution according to the invention, the drive unit 110 is activated by way of a dual joint kinematic assembly of the manual seat height or backrest inclination adjustment 11 by way of the remote unlocking mechanism which is made up from two connection levers 42 that are interconnected by one all-solid joint 5 and by way of two further all-solid joints 5 are connected either to an activation lever 7 or to the drive unit 110. A first connection lever 42 by way of all-solid joints 5 is connected both to the activation lever 7 that by way of a conventional joint 111 is articulated on a seat substructure or on a seat shell 3 by way of a conventional joint 111 as well as to the second connection lever 42 which by way of an all-solid joint 5 is articulated on the drive unit 110 that is disposed on the seat shell or the backrest 2 of the vehicle seat. On account of the activation of the activation lever 7 in the direction of the double arrow L, the drive unit 110 is pivoted in the direction of the double arrow M about the articulation of the drive unit 110 on the seat substructure or the backrest 2 of the vehicle seat.

The monolithic kinematic assembly, schematically illustrated in FIG. 17, for remotely unlocking the drive unit 110 is distinguished in that the entire activation of the manual seat height or backrest inclination adjustment 11 is producible from one part as opposed to ten parts in the case of a conventional embodiment, that the required restoring torsion spring of the conventional mechanism is obsolete in the case of a corresponding basic layout, and that the restoration of the activation lever 7 is instead caused by the all-solid joints 5. Moreover, cost saving is guaranteed by few production and assembly steps, by the possibility of molding the activation lever 7 directly onto the monolithic kinematic assembly for remote unlocking, and by intercepting abusive forces by a conventional joint that serves as the rotation axle of the activation lever 7.

Figure 18:
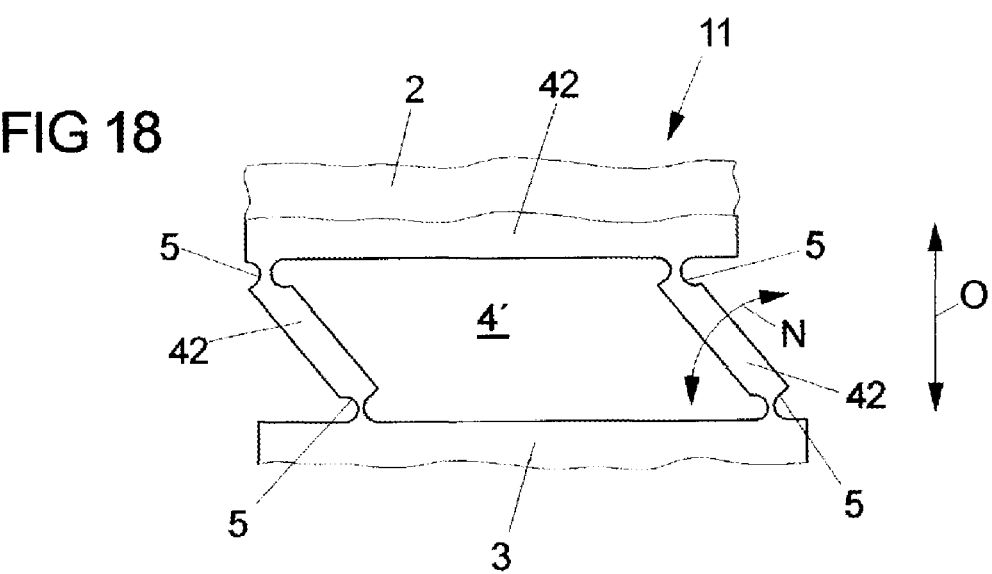
FIG. 18 shows a schematic illustration of the connection of gear members with elastically deformable all-solid joints of a quadruple joint kinematic assembly.
Figure 19:
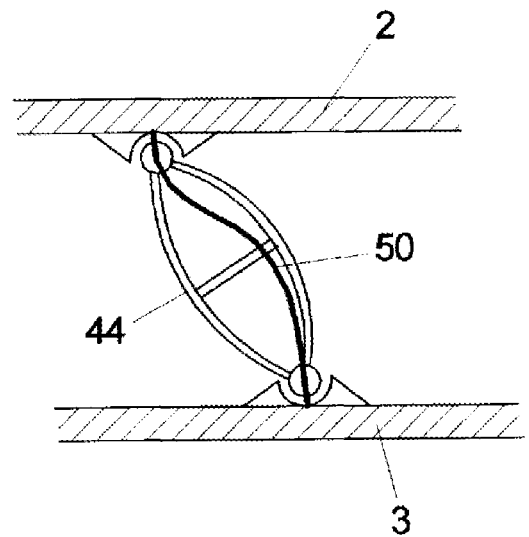
FIG. 19 shows a schematic illustration of an all-solid joint, configured as a leaf spring joint, having an integrated support geometry for enhancing the compressive stability.

A further example of a force transmission by means of a monolithic quadruple joint kinematic assembly 4' between two components of a height adjustment of a vehicle seat that are movable relative to one another is illustrated in FIGS. 18 to 20.

FIG. 18 shows the functional principle of the installation 11 for adjusting the height of a seat substructure 2 of a vehicle seat in relation to a vehicle floor pan, or to the guide rails 3 for longitudinally adjusting the vehicle seat that are connected to the vehicle floor pan, respectively. The vehicle floor pan 3 and the seat substructure 2 are in each case interconnected by two force transmission elements 4 of the monolithic quadruple joint kinematic assembly 4' on both sides of the vehicle seat, such that the spacing of the seat substructure 2 in relation to the vehicle floor pan 3 can be modified in the direction of the double arrow O according to FIG. 18 by pivoting the force transmission elements 4 in the direction of the double arrow N. For this purpose, the vehicle floor pan 3 and the seat substructure 2 by way of all-solid joints 5 are connected to the force transmission elements 4, wherein the adjustment force is transmitted to the force transmission elements 4 by means of a spindle or pinion drive. (In order to correspond to the terminology used above, the force transmission elements 4 can also be defined as connection levers 42 having integrated all-solid joints 5).

Embodiments in which the left and the right connection lever 42 do not have identical lengths are likewise possible, so as to carry out an additional desired angular movement of the seat substructure 2 in relation to the vehicle floor pan 3 across the adjustment range.

FIG. 19 shows an exemplary embodiment of one of the force transmission elements 4 which is composed of a leaf spring joint 50 having an integrated support geometry 44 for enhancing the compressive stability, and of a movable mounting at the connection to the seat substructure 2 and the vehicle floor pan 3.

Figure 20A:
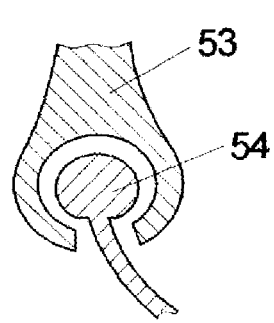
FIG. 20A shows a schematic illustration of the mounting of the all-solid joints according to FIGS. 18 and 19.

FIG. 20A in an enlarged illustration shows the rotatable mounting of a spherical or cylindrical ball head 54 that is connected to the support geometry 44 and receives one end of the leaf spring joint 50 in a joint socket 53 that is connected to the seat substructure 2 or to the vehicle floor pan 3, respectively.

The connection of the leaf spring joint 50 to the support geometry 44 can be performed in a materially integral manner, for example, such that a high functional integration is achieved at a simultaneous reduction in components for the height adjustment of the vehicle seat, a reduction in production and assembly steps, and a reduction in clearances in mountings, and a compensation of additional kinematics-related adjustment movements.

Figure 20B:
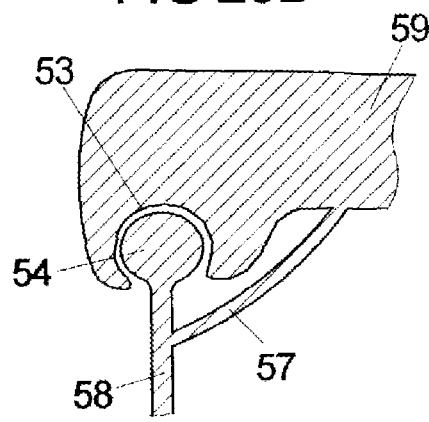
FIG. 20B shows a schematic illustration of a bionic joint.

FIG. 20B in a schematic illustration shows a force transmission element that is configured as a bionic bi-component joint, having a joint socket 53 that is disposed on a joint socket lever 59, and a spherical or cylindrical ball head 54 that is mounted in the joint socket 53 and disposed on the end of a ball head lever 58. The mounting of the ball head 54 in the joint socket 53 that encompasses the ball head 54 to a large degree is particularly suitable for receiving high compression forces, while a flexible strap 57 from an elastic material that connects the ball head lever 58 to the joint socket lever 59 holds the bionic joint together, thereby being able to absorb high traction forces and deformations.

Figure 21:
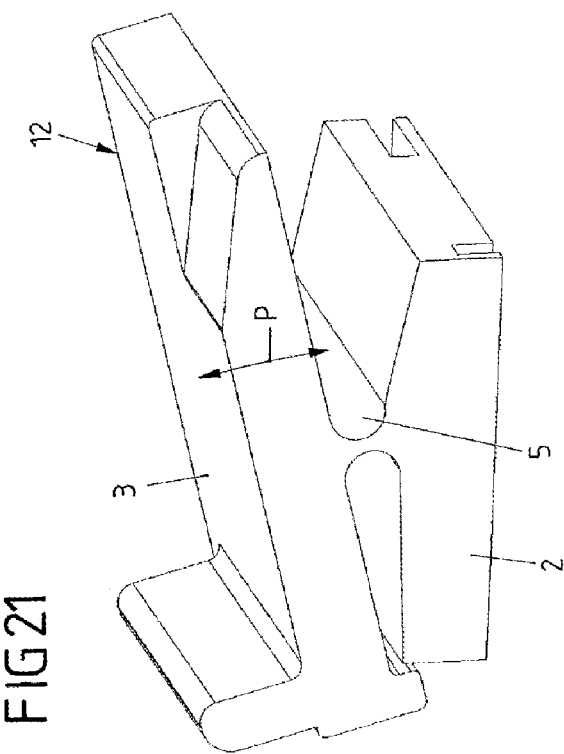
FIGS. 21 and 22 show various perspective illustrations of an adjustment means for adjusting a memory position of a longitudinal adjustment installation for a vehicle seat.
Figure 22:
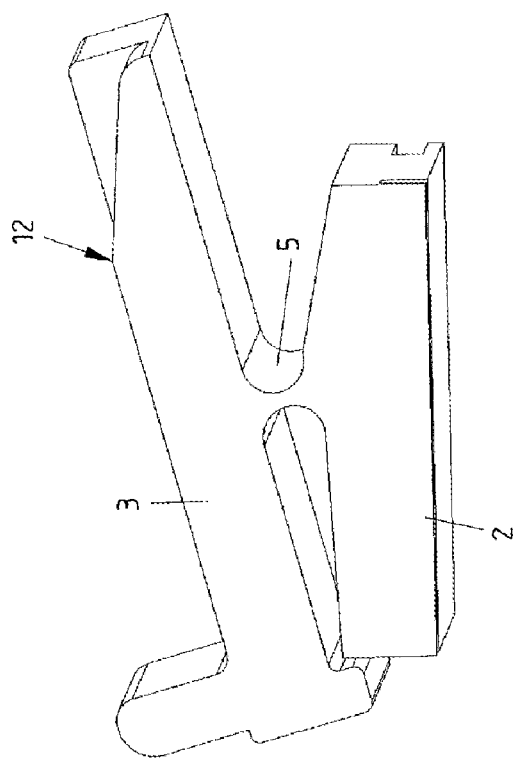

A dual-part monolithic position memory or memory block 12 of a memory installation for adjusting and recovering a memory position, for example according to DE 20 2009 002 580 U1, is illustrated in FIGS. 21 and 22 in a perspective illustration from different viewing directions as an exemplary embodiment of a material-elastic connection between two components of a vehicle seat that are movable relative to one another. The memory block 12 has an adjustment means 2 for adjusting the memory position in the longitudinal rail direction of a longitudinal rail guide of the vehicle seat, and a blocking element 3 that is pivotably connected to the adjustment means 2 and under the effect of a control element is pivotable into a locking rail in order for the adjusted memory position to be locked, and is pivotable out of the locking rail in order for a new memory position to be adjusted. The connection between the adjustment means 2 and the blocking element 3 is performed by way of an all-solid joint 5 such that the blocking element 3 is pivotable in relation to the adjustment means 2 without an additional spring element.

The connection between the adjustment means 2 and the blocking element 3 by way of an all-solid joint 5 enables the production of the memory block 12 from one part, and does not require any assembly steps for a pivoting connection between the adjustment means 2 and the blocking element 3 to be produced, wherein small deflections are guaranteed and no traction or compression forces whatsoever are exerted on the all-solid joint 5.

Figure 23:
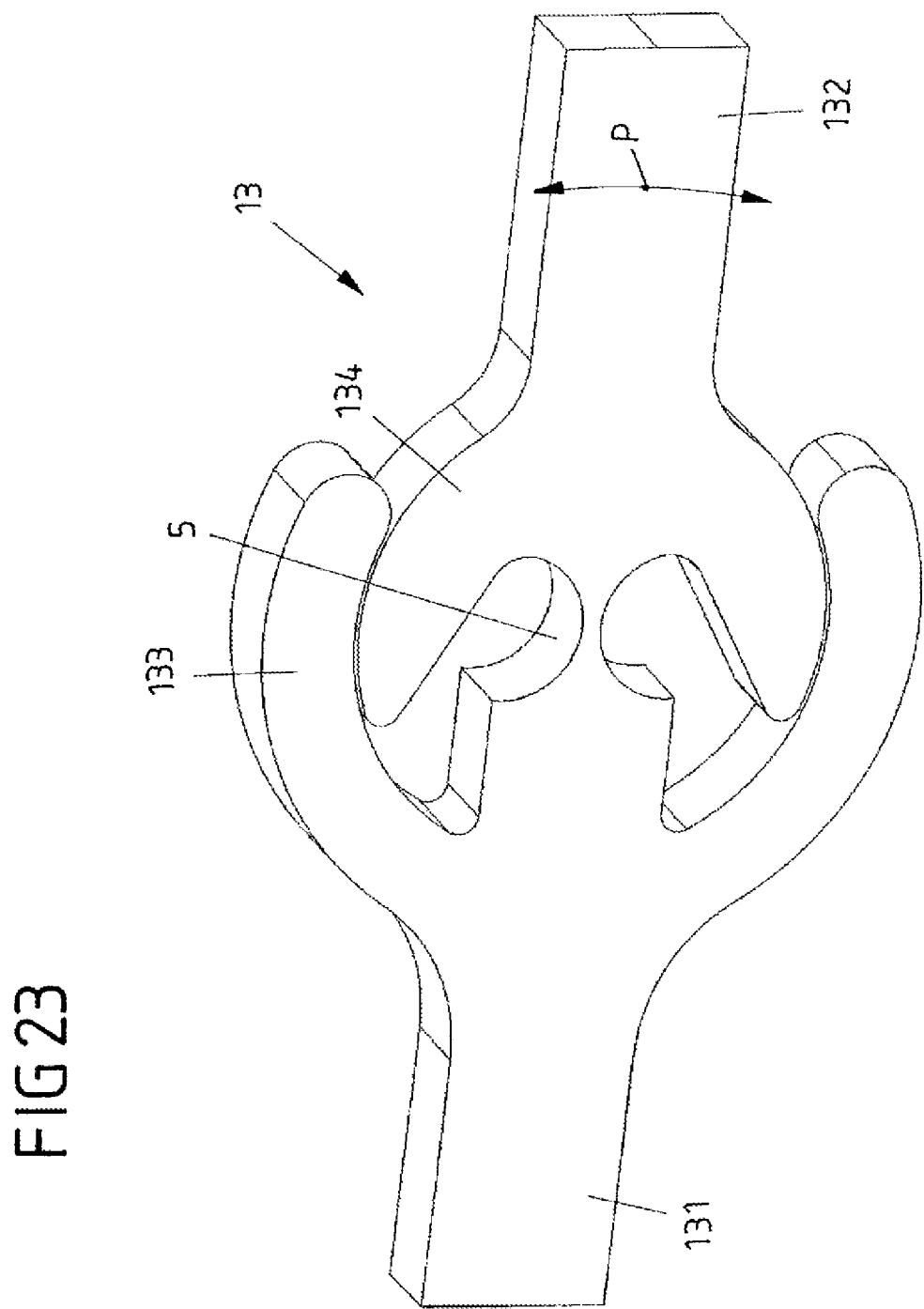
FIG. 23 shows a schematic perspective illustration of an all-solid joint that is configured as a rigid-in-compression monolithic knuckle joint.

FIG. 23 in a perspective illustration shows a force transmission element that is configured as a rigid-in-compression monolithic knuckle joint 13 which in an integral configuration has a first connection lever 131 and a second connection lever 132 which in the resting or initial position is aligned with the first connection lever 131, an all-solid joint 5 that is formed by a region of reduced flexural rigidity being configured therebetween. The flexural rigidity of the two mutually aligned connection levers 131, 132 is achieved by a partially cylindrical external fork 133 that is configured on the end of the first connection lever 131, and a partially cylindrical internal fork 134 that is disposed on the end of the second connection lever 132, the external diameter of the internal fork 134 being adapted to the internal diameter of the external fork 133 in such a manner that a sliding movement between the external partially cylindrical fork 133 and the internal partially cylindrical fork 134 is guaranteed, wherein the angular adjustability between the connection levers 131, 132 is restricted by the fork legs of the external partially cylindrical fork 133 and of the internal partially cylindrical fork 134.

Instead of the mobility of the rigid-in-compression monolithic knuckle joint 13 in one plane, as illustrated in FIG. 23, a spatial mobility of the rigid-in-compression monolithic knuckle joint 13 can also be achieved in that the two connection levers 131, 132 at the articulated connection are interconnected by way of a partially spherical socket and a partially spherical core that is guided in the partially spherical socket, having an all-solid joint 5 disposed therebetween.

The rigid-in-compression monolithic knuckle joint 13 configured in such a manner guarantees that abusive or compression forces are absorbed by the fork or socket to core connection, that the force transmission element is producible from one part and can be placed directly in the force flux in order to transmit a force between two construction elements of a vehicle seat that are movable relative to one another.

Furthermore, the knuckle joint 13 can be configured in such a manner that the two connection levers 131, 132 in the installed position are at a mutual angle rather than in mutual alignment.

An installation for the seat shell inclination linkage and adjustment 14 for lining a seat shell 2 to a seat substructure 3 and for adjusting the inclination of the seat shell 2 in relation to the seat substructure 3 is illustrated in FIGS. 24 to 27 as an exemplary embodiment for the force transmission between two construction elements that are movable relative to one another.

Figure 24:
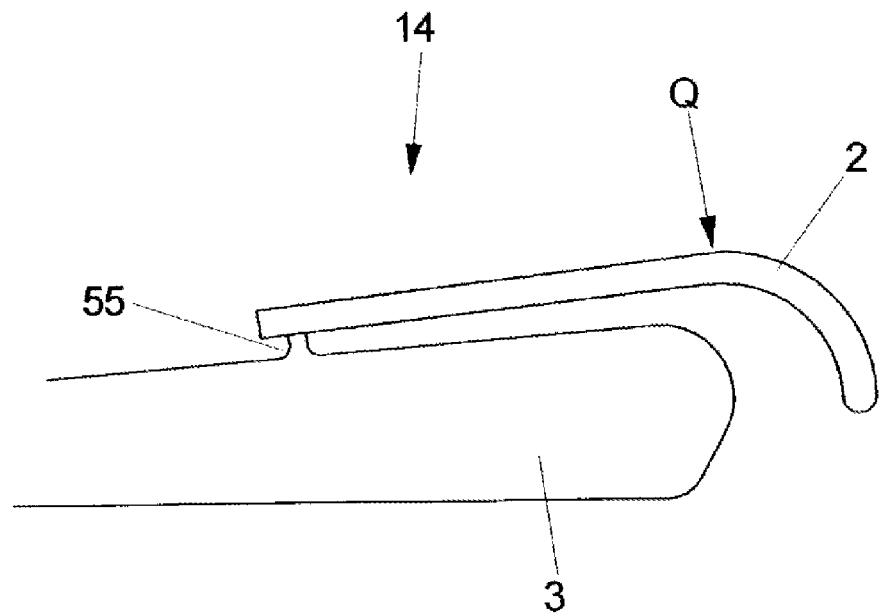
FIGS. 24 and 25 show a schematic illustration of the connection of a seat shell and of a seat substructure of a vehicle seat by means of all-solid joints for adjusting the inclination of the seat face.

FIG. 24 in a schematic side view shows the seat shell 2 in an initial position, said seat shell 2 being connected to the seat substructure 3 by way of an all-solid joint that is configured as a bending beam 55. By exerting a force in the direction of the arrow Q on the seat shell 2, the latter is lowered in the direction of the seat substructure 2, the bending beam 55 thereby being stretched according to FIG. 25. On account of the connection of the seat shell 2 to the seat substructure 3 by way of the all-solid joint that is configured as the bending beam 55, the function of adjusting the seat shell inclination in the connection of the seat shell 2 to the seat substructure 3 is guaranteed at a reduction in the number of components required in the case of a conventional construction, a reduction in the production and assembly steps, and a reduction of clearances in mountings, in the individual adaptation of the seat face inclination.

Figure 25:
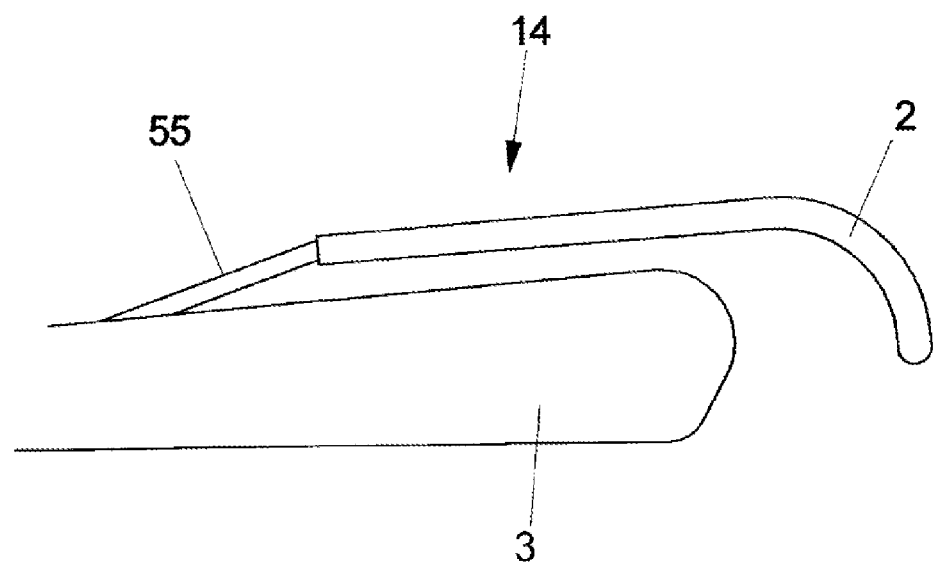
Figure 26:
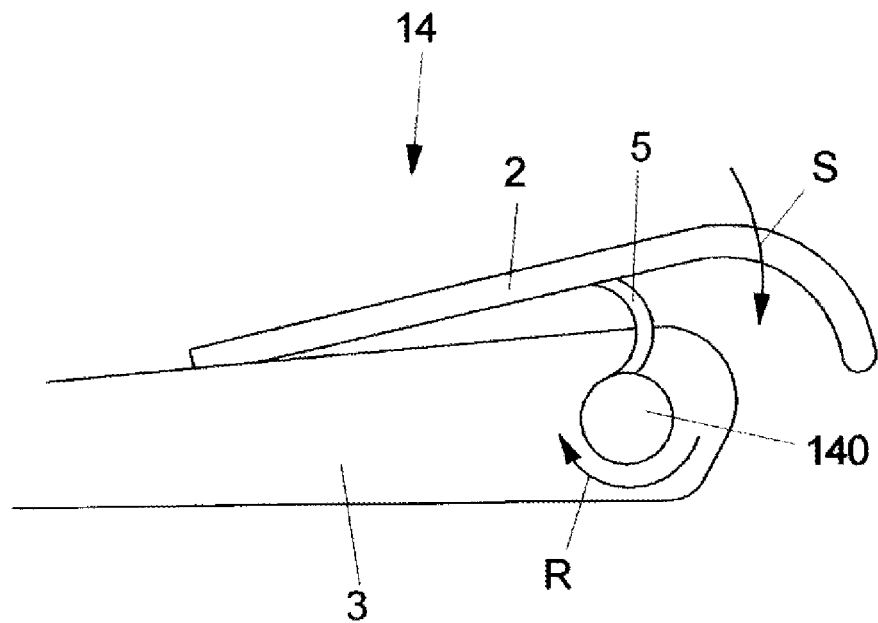
FIGS. 26 and 27 show schematic illustrations of the connection of a seat shell to a seat substructure of a vehicle seat of an all-solid joint, connected to a movable cross beam, for adjusting the inclination of the seat shell.
Figure 27:
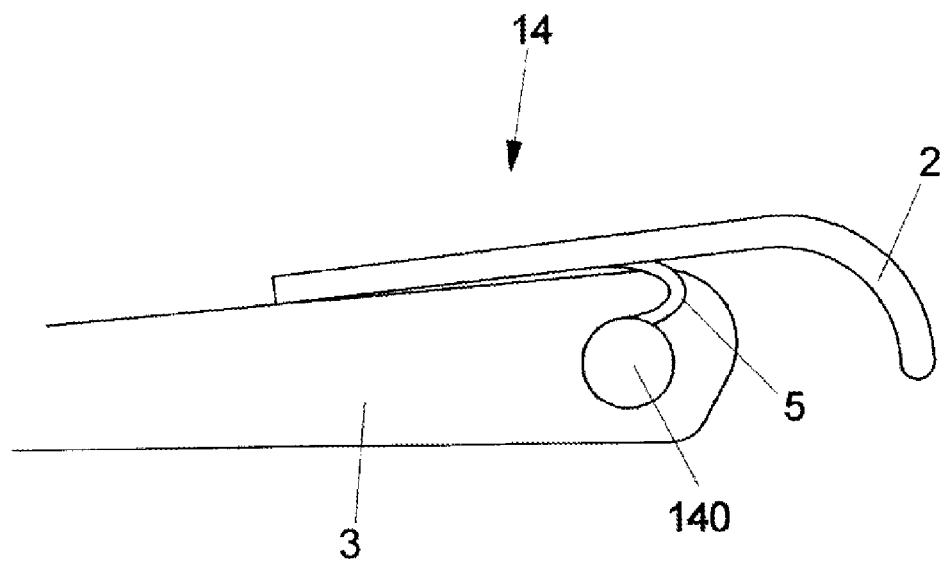

In order for the seat shell inclination to be adjusted, an adjustment installation according to FIGS. 26 and 27 can be employed in conjunction with the assembly according to FIGS. 24 and 25, said adjustment installation according to FIGS. 26 and 27 in a schematic illustration showing the connection of the seat shell 2 to the seat substructure 3 by way of an all-solid joint 5 that is disposed between a movable cross beam 140 and the lower side of the seat shell 2.

Proceeding from the inclination of the seat shell 2 as is schematically illustrated in FIG. 26, the seat shell 2 by rotating the movable cross beam 140 in the clockwise manner according to the arrow R that is indicated on the movable cross beam is lowered in the direction of the arrow S such that said seat shell 2 assumes the lowered position as is schematically illustrated in FIG. 27. The linkage of the seat shell 2 to the seat substructure 3 herein can be performed in the manner illustrated in FIGS. 24 and 25, or else by way of a conventional joint.

The seat shell inclination adjustment 14 schematically illustrated in FIGS. 26 and 27 enables an individual adaptation of the seat face inclination by rotating a movable cross beam 140, wherein all-solid joints 5 convert the rotating movement of the cross beam 140 to a pivoting movement of the seat shell 2.

The functional integration and reduction in components, a reduction in the production-related assembly steps, and a reduction of clearances in the mountings, and a compensation of additional kinematics-related adjustment movements by way of material-elastic all-solid joints 5 is also guaranteed in the case of this force transmission between two components 2, 3 which are movable relative to one another.

Figure 28:
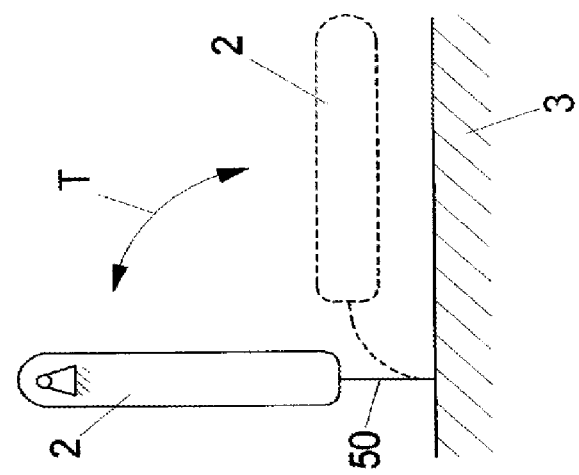
FIGS. 28 to 30 show schematic illustrations of installations for adjusting the backrest inclination or for folding down the backrest of a vehicle seat, respectively, by means of elastically deformable all-solid joints that are connected to the vehicle body.
Figure 29:
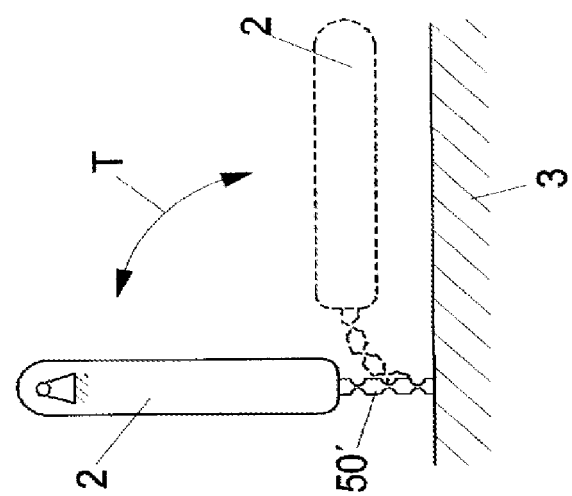
Figure 30:
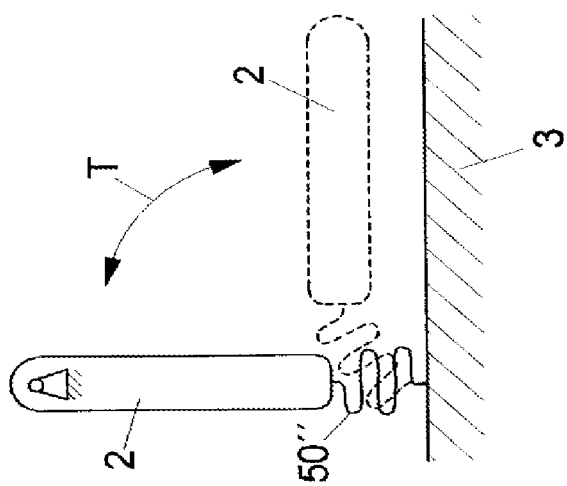

Schematic examples of the adjustment of the inclination of a backrest 2, or for folding down the backrest 2 of a vehicle seat while incorporating elastically deformable all-solid joints 50, 5', 50', are illustrated in FIGS. 28 to 30.

FIG. 28 in a schematic side view shows a backrest 2 of a vehicle seat, said backrest 2 being connected to a vehicle floor pan 3 by way of an elastically deformable leaf spring joint 50. In order for the inclination of the backrest 2 to be adjusted, or in order for the backrest 2 to be folded down in the direction of the double arrow T, as is illustrated in dashed lines of the elastically deformable leaf spring joint 50, respectively, a respective adjustment force is exerted on the backrest 2, wherein the adjustment force is applied by a spindle drive, for example, which secures the respective adjusted angle of the backrest 2 in relation to the vehicle floor pan 3.

FIG. 29 shows the connection of a backrest 2 to a vehicle floor pan 3 by way of a monolithic all-solid joint chain 50', having all-solid joints disposed between connection levers in order for the inclination of the backrest 2 to be adjusted, or in order for the backrest 2 to be folded down in the direction of the double arrow T, as is illustrated in dashed lines of the backrest 2 and of the all-solid joint chain 50' respectively.

A further assembly is illustrated in a schematic side view in FIG. 30, the elastically deformable all-solid joint in the case of this further assembly being composed of a leaf spring joint 50" that is wound in a meandering manner in order for the inclination of the backrest 2 to be adjusted, or in order for the backrest 2 to be folded down in the direction of the double arrow T, as is illustrated in dashed lines of the leaf spring joint 50" that is wound in a meandering manner and of the backrest 2.

A functional integration and a reduction in components, a reduction in the production and assembly steps, a reduction of clearances in mountings and for compensating clearances, and an integrated restoring force when placing upright are also guaranteed in the case of this assembly for adjusting the backrest.

Figure 33:
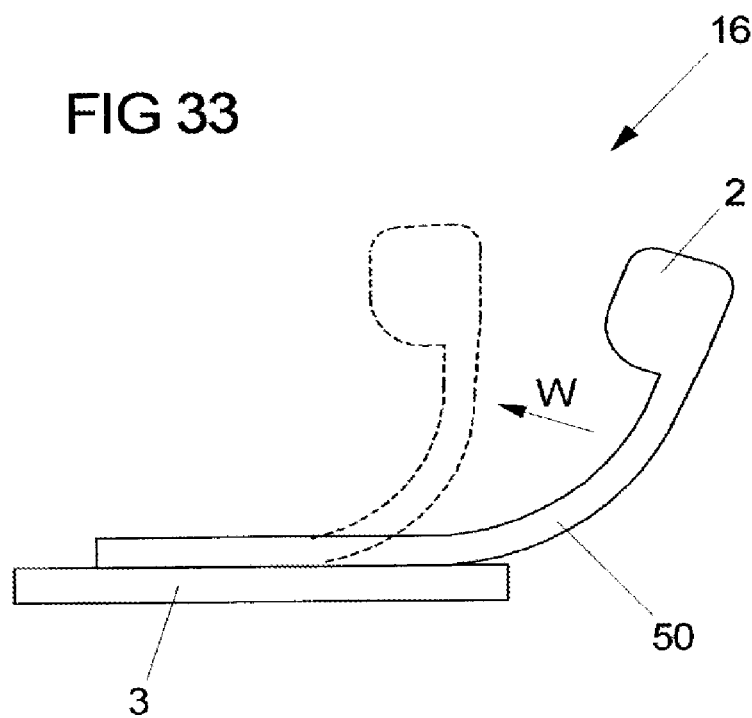
FIG. 33 shows a variant of the installation for adjusting the backrest width by means of an elastic deformation of a force transmission element.

An application of the solution according to the invention for transmitting a force between two components that are movable relative to one another is illustrated by means of a backrest width adjustment 16 in FIGS. 31 to 33.

A backrest side bolster 2 is illustrated in a schematic plan view in FIGS. 31 and 32 as one of the two components that are movable relative to one another, said backrest side bolster 2 by way of force transmission elements 4, 5, 42 that are configured as connection and adjustment elements being connected to the backrest 3 of a vehicle seat as the other of the two components that are movable relative to one another.

The connection element of the exemplary embodiment illustrated in FIG. 31 is composed of a connection lever 42 which by way of all-solid joints 5 is connected to the backrest side bolster 2, on the one hand, and to the backrest 3, on the other hand. An adjustment force in the direction of the double arrow U is exerted on an adjustment lever 4 that by way of all-solid joints 5 is connected to the backrest side bolster 2 and to the backrest 3, and to a spindle drive, for example. On account of the adjustment force that is exerted on the adjustment lever 4, pivoting of the backrest side bolster 2 in the direction of the double arrow V is caused in either direction, and the width of the backrest 3 is thus adjusted.

The connection element in the embodiment according to FIG. 32 is composed of an elastically deformable all-solid joint, for example a leaf spring joint 50, and of an adjustment lever 4 that is configured in an analogous manner to that of the assembly according to FIG. 31 and that by way of all-solid joints 5 is connected to the backrest side bolster 2 and to the backrest 3 and to a spindle drive, for example. By exerting an adjustment force on the adjustment lever 4 in the direction of the double arrow U, the backrest side bolster 2 is pivoted in the direction of the double arrow V in order for the width of the backrest 3 to be adjusted also in this design embodiment.

The backrest width adjustment 16 schematically illustrated in FIGS. 31 and 32 enables an individual adaptation of the backrest width, wherein the implementation of the adjustment movement is performed by means of a multiple element kinematic assembly, the connection of the kinematic members to the side bolster 2 or the backrest 3, respectively, is performed by way of all-solid joints 5 or of a leaf spring joint 50 having a concentrated or distributed resilience, respectively, and the generation of the adjustment force is enabled by means of an electric drive. A functional integration and a reduction in components, a reduction in production and assembly steps, and a reduction in clearances in mountings are also guaranteed in the case of this design embodiment of the solution according to the invention.

In the case of the installation for the backrest width adjustment 16 as is schematically illustrated in FIG. 33, the side bolster 2 is connected to the backrest 3 by way of an elastically deformable leaf spring joint 50, such that wide backrest adjustment, illustrated in solid lines, by exerting an adjustment force in the direction of the arrow W is adjustable to a narrower backrest width adjustment, illustrated in dashed lines, in order for the backrest width to be adapted in an individual manner. The movement of the side bolster 2 in relation to the backrest 3 herein is caused by means of the elastic deformation of the leaf spring joint 50, while the adjustment force is established manually or by means of an electric spindle or Bowden drive.

A functional integration and reduction in components, a reduction in production and assembly steps, a reduction in clearances in mountings and self-restoration are guaranteed in an initial position in this exemplary embodiment of the solution according to the invention also.

Apart from the above, variants in which the leaf spring joint 50 is replaced by an all-solid joint 5 are possible.

Figure 34:
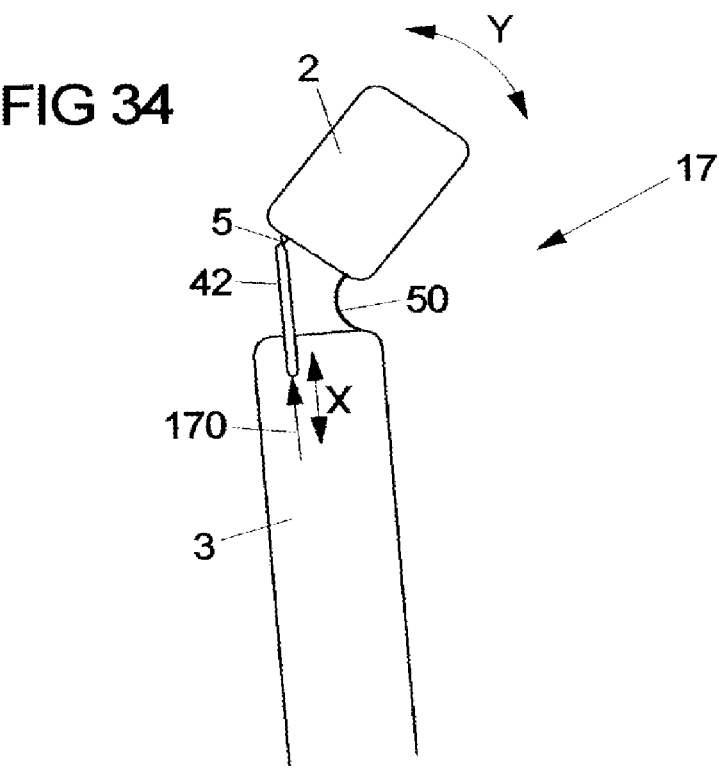
FIG. 34 shows a schematic illustration of an installation for adjusting a headrest, connected to a backrest, in the longitudinal direction of the vehicle of a vehicle seat.

As an exemplary embodiment for the transmission of force between two components that are movable relative to one another, FIG. 34 in a schematic side view shows a split backrest having a lower backrest region 3 and an upper backrest region 2, the inclination of the latter in relation to the lower backrest region 3 being adjustable. For this purpose, the two backrest regions 2, 3 are interconnected by a bending backrest adjustment 17 which has a leaf spring joint 50 that interconnects the backrest regions 2, 3, and an adjustment lever 42 that is disposed so as to be parallel with the leaf spring joint 50 and by way of an all-solid joint 5 is connected to the upper backrest region 2, on the one hand, and to an adjustment drive, for example a spindle drive 170, on the other hand. On account of the activation of the spindle drive 170, the adjustment lever 42 is moved in the direction of the double arrow X, and this adjustment movement as a consequence of the connection between the two backrest regions 2, 3 by way of the elastically deformable leaf spring joint 50 is converted to a pivoting movement of the upper backrest region 2 in the direction of the double arrow Y.

The assembly of a bending backrest as illustrated in FIG. 34 enables a functional integration and a reduction in components, a reduction in production and assembly steps, and reduction in clearances in mountings, and a compensation of kinematics-related additional adjustment movements.

As an exemplary embodiment of the connection of two components that are movable relative to one another by way of all-solid joints that are movable in a material-elastic manner, FIG. 35 shows an individual adaptation of a headrest position in the X direction, or the longitudinal direction of the vehicle, respectively, in which the headrest 2 by way of a force transmission element 4 is connected to the backrest 3 of a vehicle seat. The force transmission element 4 is composed of a connection lever 42 which at the ends thereof by way of all-solid joints 5 is connected to the headrest 2, on the one hand, and to the backrest 3, on the other hand. The adjustment in the direction of the double arrow Z, illustrated in dashed lines, is performed optionally manually or by means of an electromotive drive. Also in the case of this assembly, the adjustment function in the force transmission element 4 and the reduction in components, the reduction in production and assembly steps, and the reduction of clearances in the mountings are guaranteed. The connection lever 42 can be disposed individually or so as to be parallel with other connection levers of the identical type, or even so as to be parallel with conventional headrest guides of a dissimilar type.

FIG. 36 in a schematic plan view shows a headrest side bolster adjustment 19 as an exemplary embodiment of the adjustment of components that are movable relative to one another by means of elastically deformable force transmission elements 4.

In the case of this exemplary embodiment, the headrest 3, in a manner analogous to the connection of two backrest regions as has been described by means of FIG. 34, is connected to two side bolsters 2 that are disposed so as to be lateral to the headrest 3, by way of in each case one leaf spring joint 50 and in each case one adjustment lever 42 that is disposed so as to be parallel with the leaf spring joint 50, said adjustment lever 42 by way of an all-solid joint 5 being connected to the respective side bolster 2, on the one hand, and to an adjustment drive, for example a spindle drive 190, that is integrated in the headrest 3, on the other hand. The individual adaptation of the side bolsters 2 to the head size of a seat user is achieved by exerting an adjustment force in the direction of the double arrow U on the adjustment lever 42, this causing a pivoting movement of the side bolsters 2 in the direction of the double arrow V, wherein the connection between the side bolsters 2 and the headrest 3 is performed by means of elastically deformable all-solid joints, and the adjustment of the side bolsters 2 is performed by means of a multiple element kinematic assembly.

In one variant, the leaf spring elements 50 can be replaced by all-solid joints 5 or by conventional rotary joints.

This assembly also guarantees a functional integration and a reduction in components, a reduction in production and assembly steps, and a reduction in clearances in mountings, and a compensation of kinematics-related additional adjustment movements.

The application of the invention that has been described above by means of a plurality of exemplary embodiments is not restricted only to construction elements of a vehicle seat that are movable relative to one another and that transmit activation forces or stress forces that result from the utilization of the vehicle seat from one construction element to another construction element, but can be expanded in an analogous manner also to the applications that are related to vehicle seats, such as armrests, display screen adjusters which are attached to the rear of a headrest of the front seats.

LIST OF REFERENCE SIGNS

2, 3 Construction elements
4 Force transmission element
4' Monolithic quadruple or multiple joint kinematic assembly
4" Monolithic multiple member kinematic assembly
5 All-solid joint
5' All-solid joint chain
6 Locking mechanism
7 Activation element (activation lever)
8 Seat depth adjustment
9 Seat length adjustment
10 Bowden unit
11 Backrest inclination/seat height adjustment
12 Monolithic memory block
13 Rigid-in-compression monolithic knuckle joint
14 Seat shell inclination linkage and adjustment
15 Backrest adjustment
16 Backrest width adjustment
17 Bending backrest adjustment
18 Headrest adjustment
19 Headrest side bolster adjustment
41 Engagement lever, meshing lever
42 Connection lever
43 Push bar
44 Support geometry
50 Leaf spring joint
50' Folded leaf spring joint
51 Spring element
52 Leaf spring
53 Joint socket
54 Ball head
55 Bending beam
56 Spring bracket
57 Flexible strap
58 Ball head lever
59 Joint socket lever
70 Activation handle
81 Longitudinal guide
82, 84 (Conventional) joint 83 Gate-type guide
85 Articulation
91 Lever mounting
92 Transmission part
110 Articulation axis
111 Latch fitting
131 First articulated lever
132 Second articulated lever
133 External fork
134 Internal fork
170 Spindle drive
190 Spindle drive
421-424 Connection levers

The invention claimed is:

1. A vehicle seat comprising:
   two construction elements that are movable relative to one another; and
   at least one force transmission element which is configured to transmit activation forces and/or stress forces from one construction element to the other that result from the use of the vehicle seat wherein the at least one force transmission element via at least one joint is connected to the two construction elements, and conjointly, with the at least one joint, is an integral one-piece component part of at least one of the two construction elements, whereby the at least one force transmission element i) forms a monolithic multiple joint or multiple element kinematic assembly or ii) engages into a toothing that is connected to a seat lower part of the vehicle seat.

2. The vehicle seat as claimed in claim 1, wherein the at least one force transmission element is integral to at least one of the two construction elements and movable in a material-inherently elastic manner.

3. The vehicle seat as claimed in claim 1, wherein the at least one force transmission element comprises an all-solid joint having at least one tapered region.

4. The vehicle seat as claimed in claim 1, wherein the at least one force transmission element is an elastically deformable leaf spring joint.

5. The vehicle seat as claimed in claim 4, wherein a support element that is configured to absorb compression forces and is rotatably connected to at least one of the construction elements parallel with the leaf spring joint.

6. The vehicle seat as claimed in claim 1, wherein the at least one force transmission element and the one construction element are configured as a bi-component part, wherein one fixed component is configured from rigid levers and at least one elastic component that is disposed between the rigid levers is configured as an all-solid joint.

7. The vehicle seat as claimed in claim 1, wherein the at least one force transmission element is configured as a rigid-in-compression monolithic knuckle joint which has a partially cylindrical external fork, or a partially spherical external socket, and a partially cylindrical internal fork, or a partially spherical internal core, the external diameter of the latter bearing in a sliding manner on the internal diameter of the partially cylindrical external fork or partially spherical socket, and in that an all-solid joint is disposed between the partially cylindrical external fork, or the partially spherical socket, and the partially cylindrical internal fork, or the partially spherical core.

8. The vehicle seat as claimed in claim 1, wherein the at least one force transmission element as a bionic joint has a joint socket that is disposed on a joint socket lever, and a ball head that is disposed on the end of a ball head lever and mounted in the joint socket, and a flexible strap that connects the ball head lever to the joint socket lever.

9. The vehicle seat as claimed in claim 1, wherein the at least one force transmission element comprises a plurality of connection levers and of all-solid joints that are disposed between the connection levers and configure the monolithic multiple joint or the multiple element kinematic assembly between the construction elements.

10. The vehicle seat as claimed in claim 9, wherein the monolithic multiple joint kinematic assembly comprises a monolithic quadruple joint kinematic assembly that includes a plurality of connection levers and all-solid joints that are disposed between the connection levers is connected to an activation element and to an engagement lever that locks an adjusted position of the vehicle seat.

11. The vehicle seat as claimed in claim 1, wherein the construction elements are interconnected via elastically deformable all-solid joints and via the at least one force transmission element that is parallel with said elastically deformable all-solid joints and via all-solid joints is connected to the construction elements.

12. The vehicle seat as claimed in claim 1, wherein when the at least one force transmission element forms a monolithic multiple joint kinematic assembly, the monolithic multiple joint kinematic assembly connects an activation element that is connected to the one construction element to a locking mechanism that is connected to the other construction element.

13. The vehicle seat as claimed in claim 12, wherein a conventional joint for receiving abusive forces is disposed in the force flux between the activation element, the monolithic multiple joint kinematic assembly, and the other construction element.

14. The vehicle seat as claimed in claim 1, wherein the at least one force transmission element connects an activation element that is disposed in a first plane to a construction element that is to be activated and is disposed in a second plane.

15. The vehicle seat as claimed in claim 1, wherein the at least one force transmission element that is connected to one construction element as a monolithic gripper is linked to the connection between a first construction element that is connected to an engagement lever and a construction element to be activated.

16. The vehicle seat as claimed in claim 1, further comprising:
    a seat depth adjustment of the vehicle seat comprising:
    a seat depth adjustment part which is configured to be guided in a seat lower part of the vehicle seat and is movable relative to the latter;
    a locking installation for locking the seat depth adjustment part in an adjusted seat depth position of the seat depth adjustment part relative to the seat lower part the locking installation having a locking mechanism that is connected to the seat lower part and wherein the at least one force transmission element is connected to an activation element and to the seat depth adjustment part.

17. The vehicle seat as claimed in claim 16, wherein, when the at least one force transmission element engages into the toothing, the locking mechanism is composed of the toothing and wherein a toothed lever that is connected to the at least one force transmission element engages into said toothing.

18. The vehicle seat as claimed in claim 17, wherein the at least one force transmission element is a leaf spring joint.

19. The vehicle seat as claimed in claim 16, comprising two seat depth adjustment parts that are guided so as to be mutually spaced apart in the seat lower part of the vehicle seat, and one locking installation having perforated toothings that are disposed on the sides of the seat depth adjustment parts and toothed levers configured to be pivoted into said perforated toothings, said toothed levers each being pivotable about conventional joints that are connected to the seat lower part and via all-solid joints being connected so as to be integral to an activation element.

20. The vehicle seat as claimed in claim 19, further comprising two connection levers that by way of a first all-solid joint are connected so as to be integral to an activation element that is guided in the seat lower part and that by way of a second or third, respectively, all-solid joint are connected so as to be integral to in each case one toothed lever.

\* \* \* \* \*